(12) United States Patent
Kai

(10) Patent No.: US 8,653,876 B2
(45) Date of Patent: Feb. 18, 2014

(54) CLAMP CIRCUIT, SEMICONDUCTOR DEVICE, SIGNAL PROCESSING SYSTEM, AND SIGNAL CLAMPING METHOD

(75) Inventor: Takatsugu Kai, Tokyo (JP)

(73) Assignee: Lapis Semiconductor Co., Ltd. (JP)

( * ) Notice: Subject to any disclaimer, the term of this patent is extended or adjusted under 35 U.S.C. 154(b) by 5 days.

(21) Appl. No.: 13/406,551

(22) Filed: Feb. 28, 2012

(65) Prior Publication Data

US 2012/0249208 A1    Oct. 4, 2012

(30) Foreign Application Priority Data

Mar. 29, 2011  (JP) ................................. 2011-072778

(51) Int. Cl.
    *H03K 5/08*    (2006.01)
(52) U.S. Cl.
    USPC ............ 327/309; 327/321; 327/212; 327/307
(58) Field of Classification Search
    USPC .......................................... 327/309, 312, 321
    See application file for complete search history.

(56) References Cited

U.S. PATENT DOCUMENTS

| | | | | |
|---|---|---|---|---|
| 5,510,854 A | * | 4/1996 | Meunier | 348/695 |
| 5,550,446 A | * | 8/1996 | Schlager et al. | 318/400.19 |
| 5,760,844 A | * | 6/1998 | Jorden | 348/691 |
| 5,953,069 A | * | 9/1999 | Bruins et al. | 348/525 |
| 6,154,256 A | * | 11/2000 | Bruins | 348/533 |
| 7,106,231 B2 | * | 9/2006 | Smith et al. | 341/120 |
| 2004/0021796 A1 | * | 2/2004 | Fang et al. | 348/694 |
| 2010/0182067 A1 | * | 7/2010 | Bilhan et al. | 327/310 |

FOREIGN PATENT DOCUMENTS

| | | |
|---|---|---|
| JP | 05-292345 A | 11/1993 |
| JP | 2011-004071 A | 1/2011 |

* cited by examiner

*Primary Examiner* — Ryan Jager
(74) *Attorney, Agent, or Firm* — Rabin & Berdo, P.C.

(57) ABSTRACT

The present invention provides a clamp circuit including, a switching section including first and second switching elements connected parallel between a current supply source and a clamp capacitor; a first control section that controls the first switching element to connect the current supply source and the clamp capacitor, when the voltage of an input signal input through the clamp capacitor is lower than a first reference voltage; and a second control section that stores voltage information based on the input signal when the voltage of the input signal is lower than a second reference voltage, and that controls the second switching element to connect the current supply source and the clamp capacitor for a period predetermined based on the voltage information, when the input signal is equal to or higher than the first reference voltage.

14 Claims, 20 Drawing Sheets

CLAMP CIRCUIT, SEMICONDUCTOR DEVICE, SIGNAL PROCESSING SYSTEM, AND SIGNAL CLAMPING METHOD

CROSS-REFERENCE TO RELATED APPLICATION

This application claims priority under 35 USC 119 from Japanese Patent Application No. 2011-072778, filed on Mar. 29, 2011, the disclosure of which is incorporated by reference herein.

BACKGROUND OF THE INVENTION

1. Field of the Invention

The present invention relates to a clamp circuit, a semiconductor device, a signal processing system, and a signal clamping method. More specifically, the present invention relates to a clamp circuit, a semiconductor device, a signal processing system, and a signal clamping method, for clamping a video signal.

2. Description of the Related Art

In general, a clamp circuit used in an analog front-end for processing a video signal, is known. The clamp circuit adds a direct-current component to a video signal waveform, and fixes a predetermined portion of the waveform to a constant voltage. The clamp circuit is configured to include an input capacitor, a constant-current source, and a comparator. The comparator compares a given reference voltage with a terminal voltage, and connects the constant-current source and the input capacitor to charge the input capacitor, when the terminal voltage is lower than the reference voltage.

FIG. 2 illustrates an example of a video signal. The video signal includes a synchronization signal, a burst signal, and an image signal. When the video signal as shown in FIG. 2 is input, the clamp circuit charges so that the synchronization signal having the lowest voltage becomes equal to the reference voltage, and clamps the synchronization signal. When the level of the synchronization signal reaches the reference voltage, a normal image signal is output. Note that, for example, Japanese Patent Application Laid-Open (JP-A) No. 2011-4071 discloses such a clamp circuit.

The configuration of a basic clamp circuit is illustrated in FIG. 20. A clamp circuit 1030 illustrated in FIG. 20 is configured to include a comparator, a clamp current source, and a control switch.

The operation of the clamp circuit 1030 illustrated in FIG. 20 will be described. The control switch connects an input terminal and a clamp current source. When the switch is turned ON, current is supplied to the input capacitor. The comparator compares the input terminal voltage with a reference voltage, and turns the switch into ON state when the input terminal voltage is lower than the reference voltage. On the other hand, when the input terminal voltage is higher than the reference voltage, the switch is turned to OFF state.

However, in this method, when the input terminal voltage in a synchronization period is lower than the reference voltage, and a burst signal in the period other than the synchronization period or the input terminal voltage in a image signal period is higher than the reference voltage, charging is performed only during the synchronization period and not during the other periods. For example, in a case of NTSC video signal used in Japan or other countries, the period of a horizontal synchronization signal is 63.5 μs, and the synchronization period is about 4.5 μs. Accordingly, a charging period becomes 7.1% (=4.5 μs/63.5 μs), and therefore, the charging period per cycle is short. Accordingly, numbers of cycles for completing the charging is necessary, and therefore, the charging time (the time from the start to completion of charging) increases.

Regarding the above, the charging time may be shortened by decreasing the capacitance of the input capacitor.

Further, the charging time may be shortened by increasing a clamp current (a current supplied to charge the input capacitor) (for example, see JP-A No. 5-292345).

However, when the capacitance of the input capacitor is decreased, the sagging (variation) of the input terminal during clamping increases, and the stability of the input terminal voltage against noise decreases.

Further, as the technique disclosed in JP-A No. 5-292345, when the charging time is shortened by increasing the clamp current, since the clamp current flows outside toward the signal source, a voltage drop occurs in relation to the impedance of the signal source. This voltage drop increases the input terminal voltage and the voltage does not drop when the clamp current stops. As a result, the input terminal voltage and the voltage of the signal source change. If the clamp current is large, since the signal source voltage greatly changes, difference between a synchronization signal level and a target clamp voltage increases.

SUMMARY OF THE INVENTION

The present invention provides a clamp circuit, a semiconductor device, a signal processing system, and a signal clamping method, that may shorten charging time required for charging a clamp capacitor, without decreasing the capacitance of the clamp capacitor and without increasing a clamp current required for charging.

A first aspect of the present invention is a clamp circuit including: a switching section including a first switching element and a second switching element connected in parallel between a current supply source and a clamp capacitor; a first control section that controls the first switching element to connect the current supply source and the clamp capacitor to charge the clamp capacitor by the current supply source, when the voltage of an input signal input via the clamp capacitor is lower than a first reference voltage; and a second control section that stores voltage information based on the input signal when the voltage of the input signal is lower than a second reference voltage, and that controls the second switching element to connect the current supply source and the clamp capacitor to charge the clamp capacitor by the current supply source for a predetermined period, predetermined based on the voltage information, when the input signal is equal to or higher than the first reference voltage.

A second aspect of the present invention is a semiconductor device including: a first terminal electrically connected to a clamp capacitor that adds a voltage to an inputted signal to generate an input signal; a second terminal electrically connected to a current supply source; a switching section including a first switching element and a second switching element connected in parallel between the first terminal and the second terminal; a first control section that controls the first switching element to connect the current supply source and the clamp capacitor to charge the clamp capacitor by the current supply source, when the voltage of the input signal input via the clamp capacitor is lower than a first reference voltage; and a second control section that stores voltage information based on the input signal when the voltage of the input signal is lower than a second reference voltage, and that controls the second switching element to connect the current supply source and the clamp capacitor to charge the clamp capacitor by the current supply source for a predetermined period, predetermined based on the voltage information, when the input signal is equal to or higher than the first reference voltage.

A third aspect of the present invention is a signal clamping method including: generating an input signal by adding a voltage to an inputted signal using a clamp capacitor; controlling, by a first control section, a first switching element connected between the clamp capacitor and a current supply source, such that the current supply source and the clamp capacitor are connected so that the clamp capacitor is charged by the current supply source, when the voltage of the input signal input via the clamp capacitor is lower than a first reference voltage; and controlling, by a second control section, such that voltage information in accordance with the input signal is stored, when the voltage of the input signal is lower than a second reference voltage, and such that a second switching element, connected in parallel to the first switching element, connects the current supply source and the clamp capacitor to charge the clamp capacitor by the current supply source for a predetermined period, predetermined based on the voltage information, when the voltage of the input signal is equal to or higher than the first reference voltage.

According to the above aspects, the present invention may shorten charging time required for charging a clamp capacitor, without decreasing the capacitance of the clamp capacitor and without increasing a clamp current required for charging.

BRIEF DESCRIPTION OF THE DRAWINGS

Exemplary embodiments of the present invention will be described in detail based on the following figures, wherein.

DETAILED DESCRIPTION OF THE INVENTION

[First Exemplary Embodiment]

Hereinafter, a clamp circuit and a signal processing system formed in a large-scale integration (LSI: a semiconductor integrated circuit or a semiconductor device) including the clamp circuit according to a first exemplary embodiment of the present invention, will be described in detail with reference to the drawings.

Figure 1:
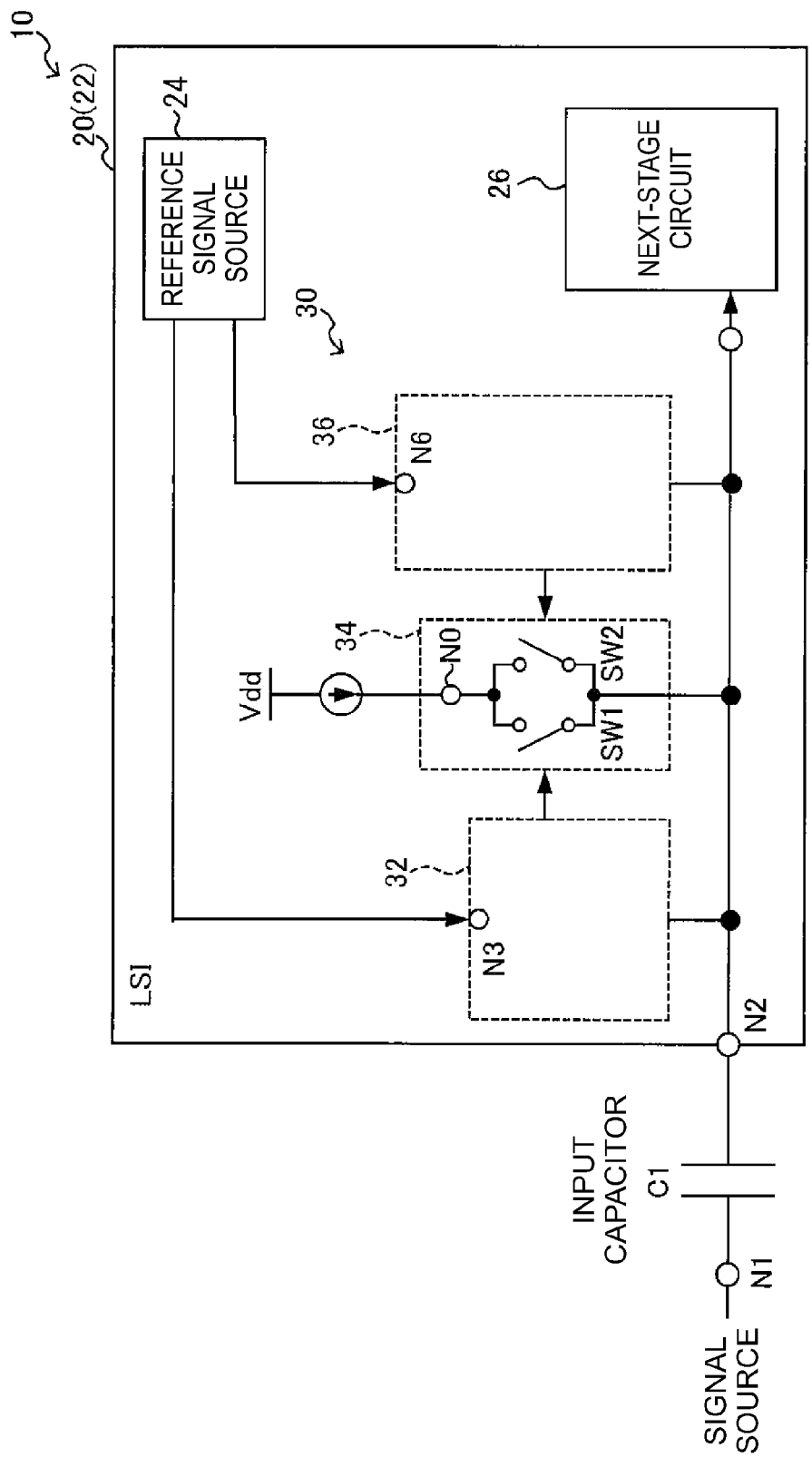
FIG. 1 is a schematic configuration diagram illustrating a signal processing system including a clamp circuit according to a first exemplary embodiment.

First, a configuration of a signal processing system of the present exemplary embodiment will be described. A schematic configuration of the signal processing system of the present exemplary embodiment is illustrated in FIG. 1. A signal processing system 10 of the present exemplary embodiment illustrated in FIG. 1 is configured to include an input capacitor C1 to which a video signal is input from a signal source through a node N1, and a LSI 20. The LSI 20 includes a substrate 22 on which a clamp circuit 30, a reference signal source 24, and a next-stage circuit 26, are formed. The clamp circuit 30 clamps a signal input from the input capacitor C1 via a node N2. The reference signal source 24 supplies a clamp reference voltage to a node N3 of the clamp circuit 30, and supplies a reference voltage to a node N6. The next-stage circuit 26 applies predetermined video processing on the clamped signal input via the node N2.

Figure 2:
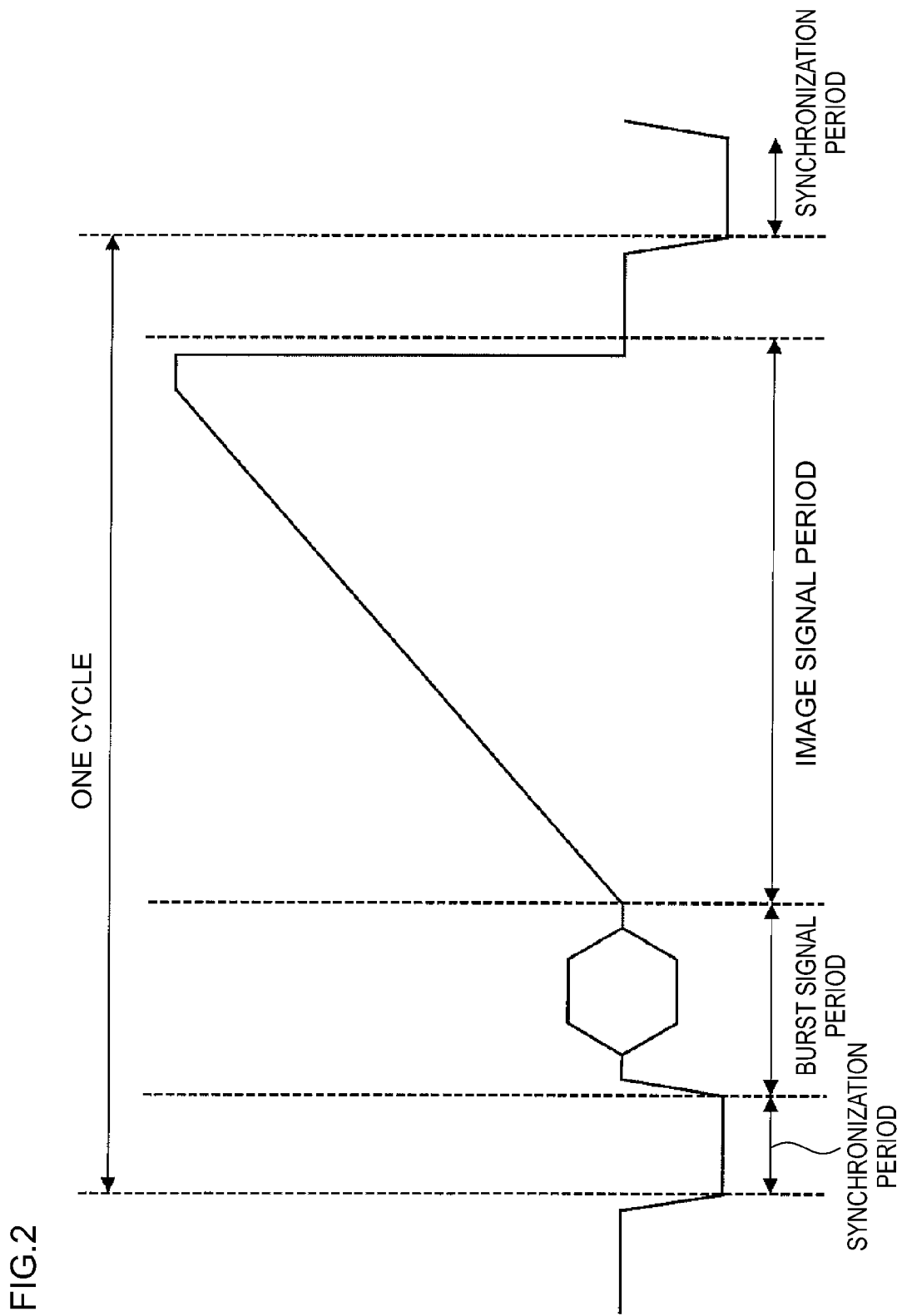
FIG. 2 is a diagram illustrating an example of a video signal to be processed by a signal processing system according to the first exemplary embodiment.

A specific example of a video signal to be processed by the signal processing system 10 of the present exemplary embodiment is illustrated in FIG. 2. The video signal is a composite image signal. As illustrated in FIG. 2, the video signal has plural cycles, in which one cycle period includes a synchronization signal (synchronization period), a burst signal (burst signal period), and an image signal (image signal period). The synchronization signal is a signal for determining the scanning position and timing, and the burst signal is a signal that serves as a reference of a color phase.

Figure 3:
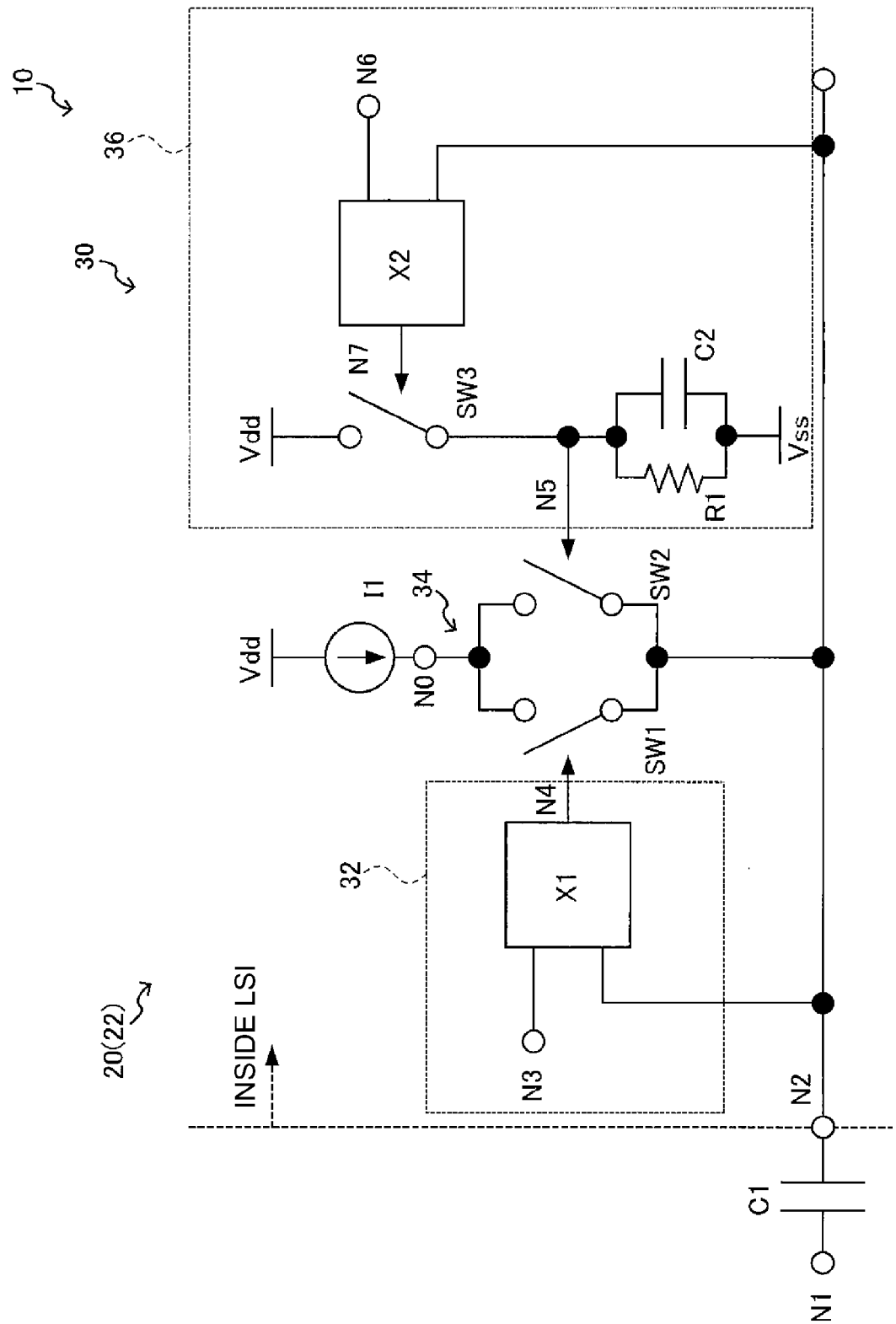
FIG. 3 is a circuit diagram illustrating an example of the clamp circuit according to the first exemplary embodiment.

A circuit diagram of an example of the clamp circuit 30 of the present exemplary embodiment is illustrated in FIG. 3.

The clamp circuit 30 of the present exemplary embodiment adds a direct-current component of the video signal to an image signal, and fixes a bottom portion of the synchronization signal to a clamp reference voltage. The clamp circuit 30 is configured to include a switching circuit 34, a first control circuit 32, and a second control circuit 36. The switching circuit 34 connects a node NO, to which a current source I1 for supplying a clamp current for charging a terminal capacitor C1 is connected, and a node N2.

The switching circuit 34 is configured to include a switching element SW1 and a switching element SW2. The first control circuit 32 includes a comparator X1 that compares the clamp reference voltage (hereinafter referred to as a clamp reference voltage V (N3)) input to the node N3 and a signal voltage (hereinafter referred to as a voltage V (N2)) of the node N2. Further, the comparator X1 outputs, when the clamp reference voltage is higher than the signal voltage, a control signal (a control signal of H level that turns ON the switching element SW1) to a control node N4, so that the switching element SW1 of the switching circuit 34 is turned ON. On the other hand, the second control circuit 36 includes a capacitor C2, a resistor R1 connected in parallel to the capacitor C2, a switching element SW3, and a comparator X2. The capacitor C2 is connected between a node N5, to which the control signal (a control signal of H level turns ON the switching element SW2) for controlling the switching element SW2 is outputted, and a ground potential Vss. The switching element SW3 connects a power supply potential Vdd and a control node N5. The comparator X2 compares a reference voltage (hereinafter referred to as a reference voltage V (N6)) input to a node N6 and a signal voltage of the node N2. Further, the comparator X2 outputs a control signal (a control signal of H level that turns the switching element SW3 ON) to a control node N7, so that the switching element SW3 is turned ON when the reference voltage is higher than the signal voltage. Note that, in the present exemplary embodiment, the reference voltage is set to a voltage in which the voltage value is smaller than the clamp reference voltage (details will be described later).

Next, a clamp operation of the clamp circuit 30 of the present exemplary embodiment and the voltages of respective nodes (including the control node) will be described.

Figure 4:
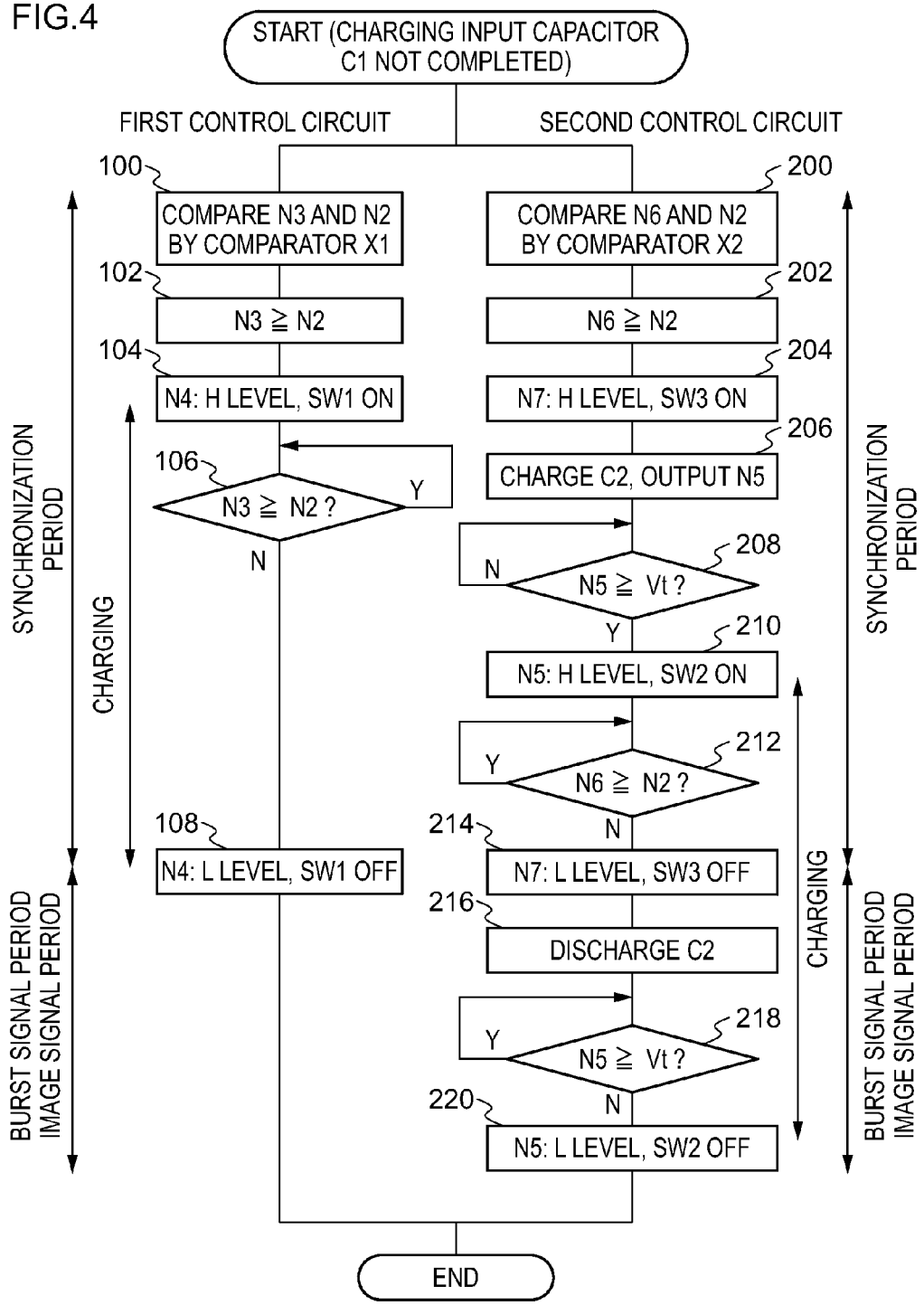
FIG. 4 is a flowchart illustrating a cramp operation of the clamp circuit, when the charging of an input capacitor C1 is not completed, according to the first exemplary embodiment.

First, a clamp operation and voltages of respective nodes, when the charging of the input capacitor C1 is not completed, will be described. FIG. 4 illustrates a flowchart of an example of a clamp operation of the clamp circuit 30, when the charging of the input capacitor C1 is not completed. Further, FIG. 5 illustrates an example of voltages of respective nodes of the clamp circuit 30.

Figure 5:
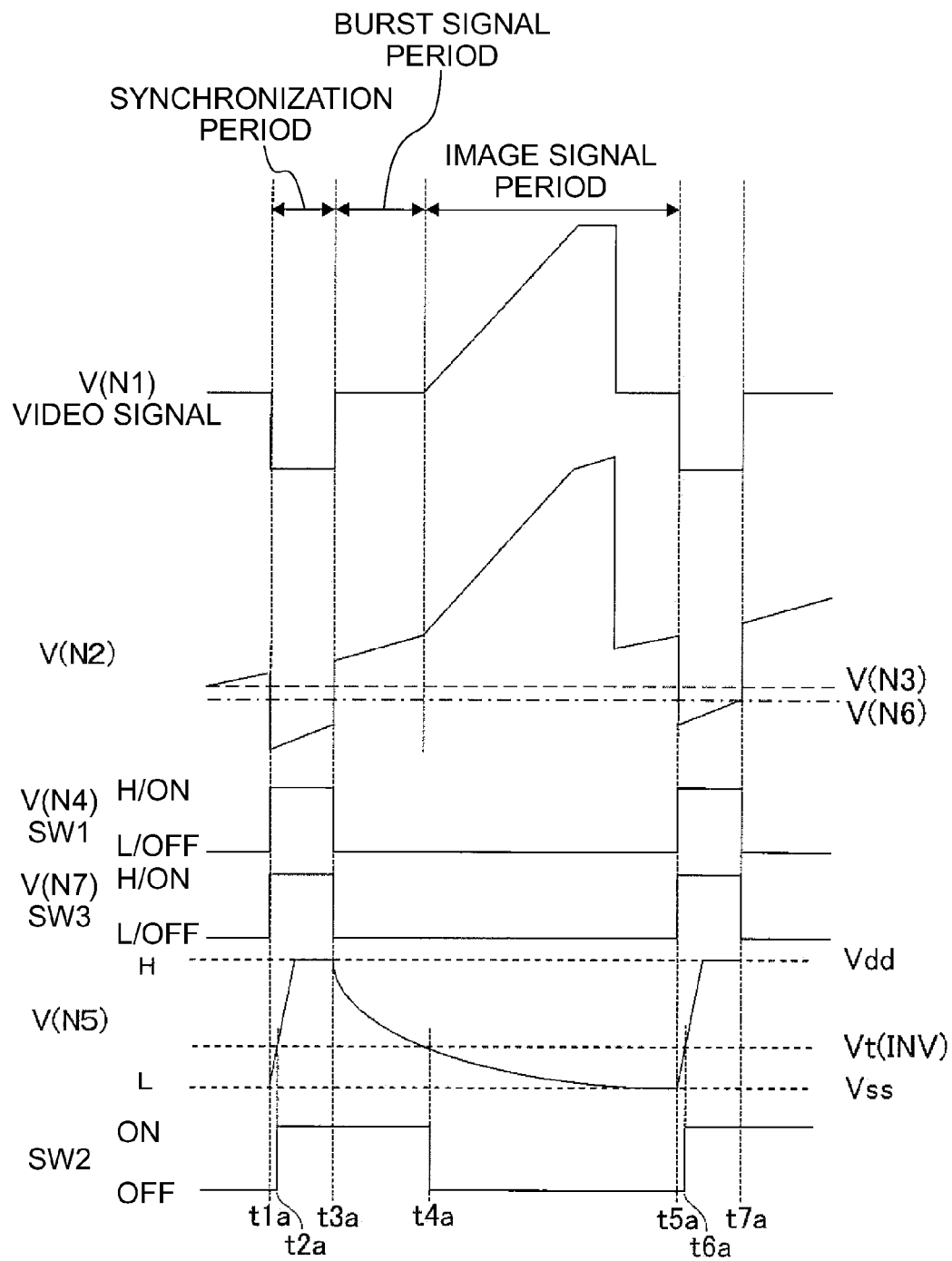
FIG. 5 is a diagram illustrating voltages of respective nodes of the clamp circuit, when the charging of the input capacitor C1 is not completed, according to the first exemplary embodiment.

As illustrated in FIG. 5, when the charging of the input capacitor C1 is not completed, the voltage V (N2) of the node N2 in the synchronization period is lower than the reference voltage V (N6) of the node N6. Further, the voltage V (N2) of the node N2 in the burst signal period and the image signal period, after end of the synchronization period, is higher than the clamp reference voltage V (N3) of the node N3.

The operation of the first control circuit 32 of the clamp circuit 30 will be described. The comparator X1 compares the clamp reference voltage V (N3) of the node N3 and the voltage V (N2) of the node N2 (FIG. 4: step 100). In the synchronization period, since the clamp reference voltage V (N3) is equal to or higher than the voltage V (N2) of the node N2 (FIG. 4: step 102), a control signal of H level is output from the comparator X1 to the control node N4, and the switching element SW1 becomes ON state (FIG. 4: step 104, FIG. 5: timing t1a).

The operation of the second control circuit 36 of the clamp circuit 30 will be described. The comparator X2 compares the reference voltage V (N6) of the node N6 and the voltage V (N2) of the node N2 (FIG. 4: step 200). In the synchronization period, since the reference voltage V (N6) is equal to or higher than the voltage V (N2) of the node N2 (FIG. 4: step 202), a control signal of H level is output from the comparator X2 to the control node N7, and the switching element SW3 is turned to ON state (FIG. 4: step 204, FIG. 5: timing t1a).

When the switching element SW3 becomes ON state, in the second control circuit 36, the power supply potential Vdd is connected to the capacitor C2, and therefore the capacitor C2 is charged. Further, the voltage V (N5) of the control node N5 is output to the switching element SW2 of the switching circuit 34 as a control signal (FIG. 4: step 206, FIG. 5: timing t1a).

In the clamp circuit 30 of the present exemplary embodiment, as an example, MOS transistors are used as the switching elements SW1, SW2, and SW3. The switching element SW2 maintains the OFF state until the voltage V (N5) of the control node N5 exceeds a threshold voltage Vt of the MOS transistor (FIG. 4: negative determination in step 208, FIG. 5: period between timing t1a and timing t2a). When the voltage V (N5) of the control node N5 exceeds the threshold voltage Vt of the MOS transistor (FIG. 4: affirmative determination in step 208, FIG. 5: timing t2a), the switching element SW2 becomes ON state (FIG. 4: step 210, FIG. 5: timing t2a).

Accordingly, at timing t1a, the switching element SW1 controlled by the first control circuit 32 becomes ON state, and the input capacitor C1 is charged by the current I1 supplied from the current source I1. Further, at timing t2a, the switching element SW2 controlled by the second control circuit 36 also becomes ON state, and the input capacitor C1 is charged by the current I1 supplied from the current source I1.

In the synchronization period of the video signal, becomes, the voltage V (N2) of the node N2<the reference voltage V (N6)<the clamp reference voltage V (N3) (FIG. 4: affirmative determination in step 106 and affirmative determination in step 212, FIG. 5: period between timing t1a and timing t3a). Accordingly, the voltage V (N4) of the control node N4 and the voltage V (N5) of the control node N5 becomes H level, the switching elements SW1 and SW2 of the switching circuit 34 become ON state, and the input capacitor C1 is charged by the current I1 supplied from the current source I1.

When the synchronization period of the video signal ends, and the burst signal period and the image signal period start (FIG. 5: period starting from timing t3a), becomes, the reference voltage V (N6)<the clamp reference voltage V (N3) <than the voltage V (N2) of the node N2 (FIG. 4: negative determination in step 106 and negative determination in step 212). Accordingly, the comparator X1 of the first control circuit 32 outputs a control signal of L level to the control node N4. As a result, the switching element SW1 of the switching circuit 34 becomes OFF state (FIG. 4: step 108, FIG. 5: timing t3a).

On the other hand, in the second control circuit 36, the comparator X2 outputs a control signal of L level to the control node N7. As a result, the switching element SW3 becomes OFF state (FIG. 4: step 214, FIG. 5: timing t3a). When the switching element SW3 becomes OFF state, charges stored between both ends of the capacitor C2 are discharged by the resistor R1 (FIG. 4: step 216). By the discharging of the capacitor C2, the voltage V (N5) of the control node N5 changes from H level to the ground potential Vss with a predetermined period (predetermined based on, for example, the amount of charges stored in the capacitor C2, for example). Here, when the voltage V (N5) of the control node N5 is equal to or higher than the threshold voltage Vt of the switching element SW2 (FIG. 4: affirmative determination in step 218), the switching element SW2 maintains the ON state, and the input capacitor C1 is charged by the current I1 supplied from the current source I1. On the other hand, when the voltage V (N5) of the control node N5 becomes lower than the threshold voltage Vt of the switching element SW2 (FIG. 4: negative determination in step 218, FIG. 5: timing t4a), the switching element SW2 becomes OFF state (FIG. 4: step 220), and no current is supplied from the current source I1 to the node N2. Accordingly, the charging of the input capacitor C1 stops.

Figure 6:
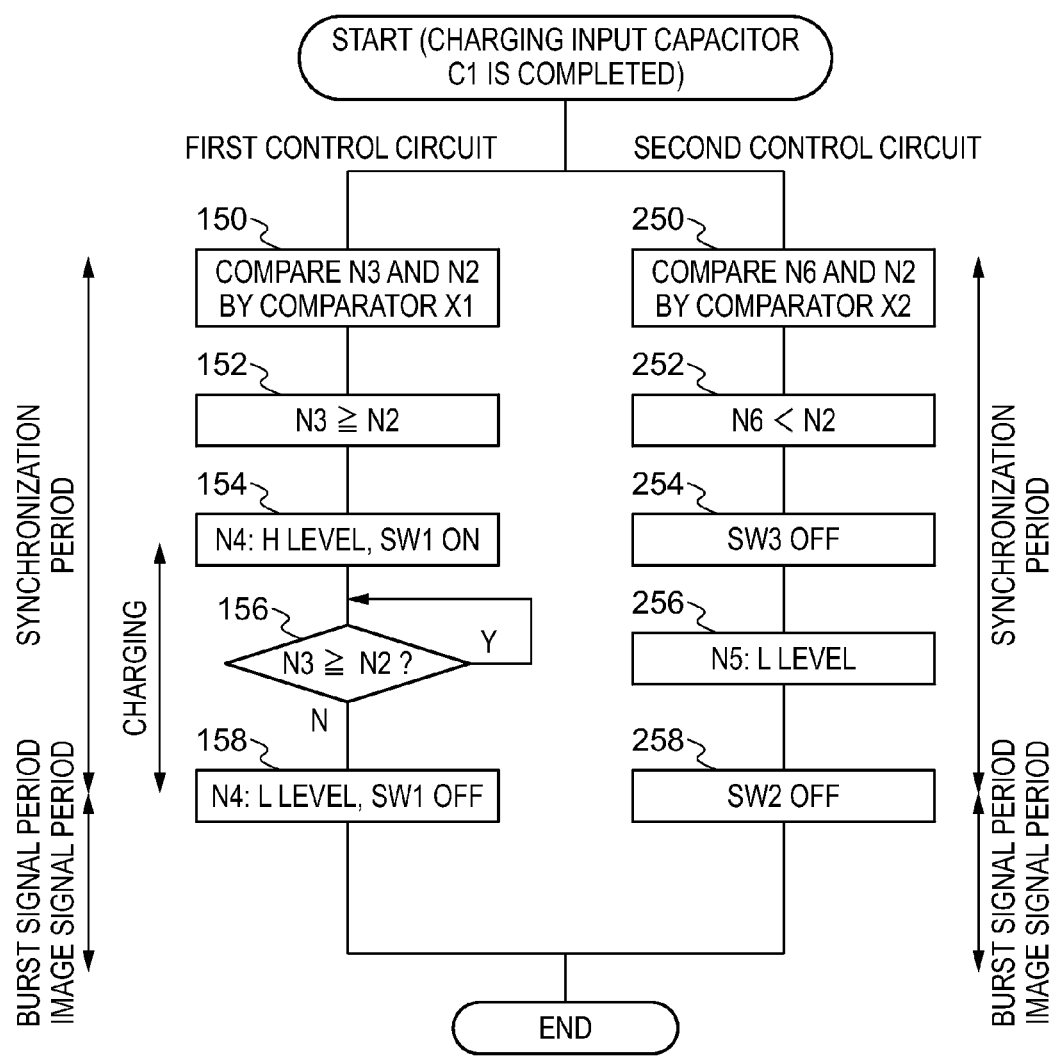
FIG. 6 is a flowchart illustrating a clamp operation of the clamp circuit, when the charging of the input capacitor C1 is completed, according to the first exemplary embodiment.

Next, the clamp operation and the voltages of respective nodes, when the charging of the input capacitor C1 is completed, will be described. FIG. 6 illustrates a flowchart of an example of a clamp operation in the clamp circuit 30, when the charging of the input capacitor C1 is completed. Further, FIG. 7 illustrates an example of the voltages of respective nodes of the clamp circuit 30.

Figure 7:
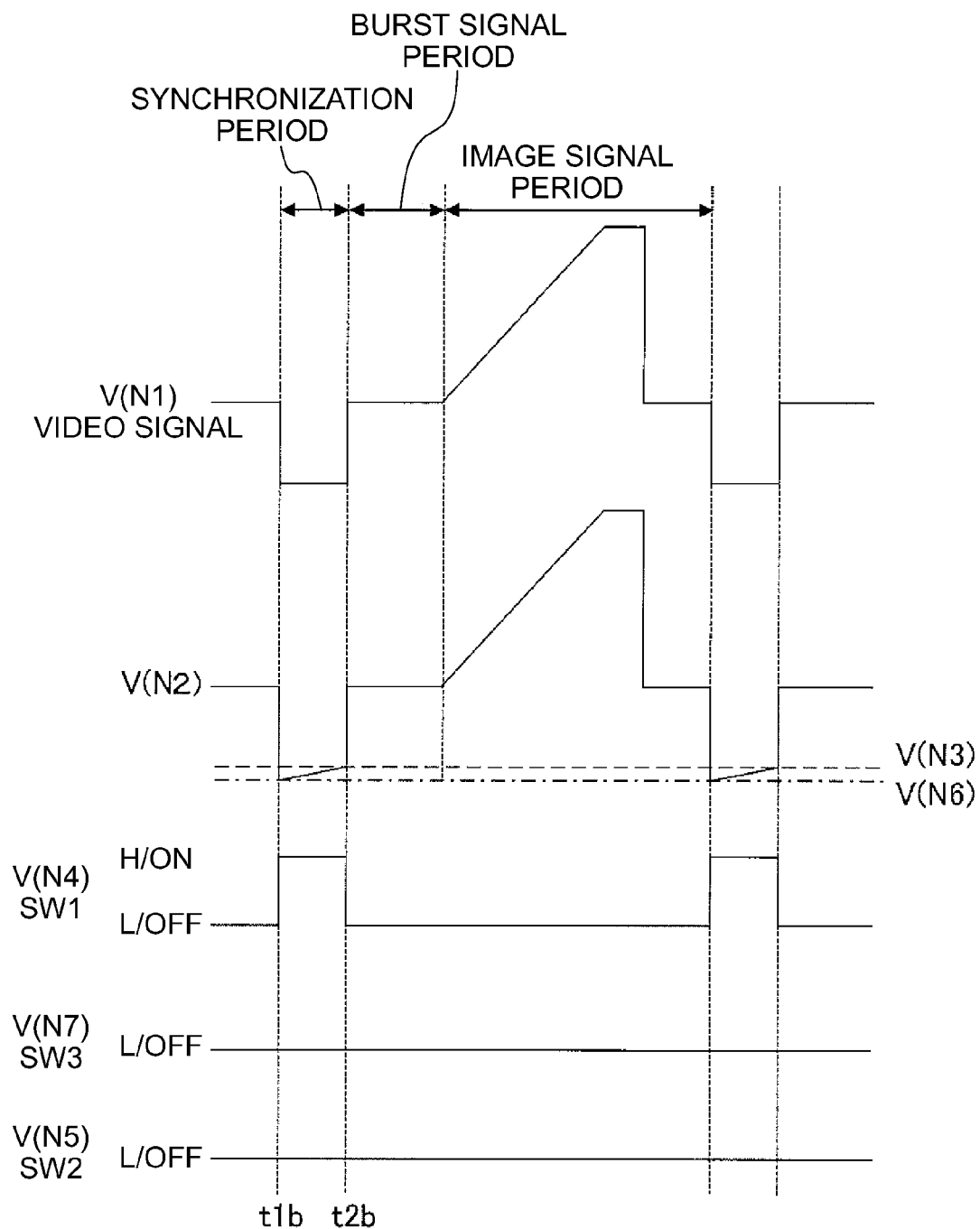
FIG. 7 is a diagram illustrating nodes voltages of the clamp circuit, when the charging of the input capacitor C1 is completed, according to the first exemplary embodiment.

As illustrated in FIG. 7, when the charging of the input capacitor C1 is completed, the voltage V (N2) of the node N2 in the synchronization period is higher than the reference voltage V (N6) of the node N6, and is lower than the clamp reference voltage V (N3) of the node N3. Further, the voltage V (N2) of the node N2 in the burst signal period and the image signal period, after end of synchronization period, is higher than the clamp reference voltage V (N3) of the node N3.

The operation of the first control circuit 32 of the clamp circuit 30 will be described. The comparator X1 compares the clamp reference voltage V (N3) of the node N3 and the voltage V (N2) of the node N2 (FIG. 6: step 150). In the synchronization period, since the clamp reference voltage V (N3) is equal to or higher than the voltage V (N2) of the node N2 (FIG. 6: step 152), a control signal of H level is output from the comparator X1 to the control node N4, and the switching element SW1 becomes ON state (FIG. 6: step 154, FIG. 7: timing t1b).

The operation of the second control circuit 36 of the clamp circuit 30 will be described. The comparator X2 compares the reference voltage V (N6) of the node N6 and the voltage V (N2) of the node N2 (FIG. 6: step 250). In the state where the charging of the input capacitor C1 is completed, since the reference voltage V (N6) is lower than the voltage V (N2) of the node N2 (FIG. 6: step 252), a control signal of L level is output from the comparator X2 to the control node N7, and the switching element SW3 is maintained in the OFF state (FIG. 6: step 254, FIG. 7: timing t1b).

Since the switching element SW3 is in the OFF state, the voltage V (N5) of the control node N5 output to the switching element SW2 of the switching circuit 34 maintains the L level (FIG. 6: step 256). Accordingly, the switching element SW2 is maintained in the OFF state (FIG. 6: step 258, FIG. 7: timing t1b).

As above, at timing t1b, the switching element SW1 controlled by the first control circuit 32 becomes ON state, and the input capacitor C1 is charged by the current I1 supplied from the current source I1. On the other hand, although the switching element SW2 controlled by the second control circuit 36 is maintained in the OFF state, since the switching element SW1 is in the ON state, the input capacitor C1 is charged by the current I1 supplied from the current source I1.

In the synchronization period of the video signal, since, the reference voltage V (N6)<the voltage V (N2) of the node N2<the clamp reference voltage V (N3) (FIG. 6: affirmative determination in step 156, FIG. 7: period between timing t1b and timing t2b), the voltage V (N4) of the control node N4 becomes H level, the voltage V (N5) of the control node N5 becomes L level, the switching elements SW1 of the switching circuit 34 becomes ON state, and the switching element SW2 is maintained in the OFF state. As a result, the input capacitor C1 is charged by the current I1 supplied from the current source I1.

When the synchronization period of the video signal ends, and the burst signal period and the image signal period start (FIG. 7: period starting from timing t2b), becomes, the reference voltage V (N6)<the clamp reference voltage V (N3)<the voltage V (N2) of the node N2 (FIG. 6: negative determination in step 156). Accordingly, the comparator X1 of the first control circuit 32 outputs a control signal of L level to the control node N4. As a result, the switching element SW1 of the switching circuit 34 becomes OFF state (FIG. 6: step 158, FIG. 6: timing t2b).

On the other hand, in the second control circuit 36, since the control node N7 maintains the control signal of L level, the switching element SW3 maintains the OFF state, the switching element SW2 also maintains the OFF state (FIG. 6: step 258, FIG. 7: period starting from timing t2b).

Accordingly, in the burst signal period and the image signal period, since both the switching elements SW1 and SW2 of the switching circuit 34 are in the OFF state, no current I1 is supplied from the current source I1, and the input capacitor C1 is not charged.

As described above, the clamp circuit 30 in the semiconductor device 20 of the signal processing system 10 of the present exemplary embodiment includes the first control circuit 32, the switching circuit 34, and the second control circuit 36. The switching circuit 34 includes the switching elements SW1 and SW2, connected in parallel between the current source I1 and the node N2 (the input capacitor C1), that turn to ON state in accordance with the control signal of H level. The first control circuit 32 includes the comparator X1, compares the voltage V (N2) of the node N2 with the clamp reference voltage V (N3) of the node N3, and outputs a control signal of H level to the control node N4, when the voltage V (N2) is equal to or lower than the clamp reference voltage V (N3). Further, the second control circuit 36 includes the comparator X2, the capacitor C2 having one end connected to the ground potential Vss, the resistor R1 connected in parallel to the capacitor C2, and the switching element SW3 that connects the other end of the capacitor C2 and the power supply potential Vdd and that becomes ON state in accordance with a control signal of H level. The comparator X2 compares the voltage V (N2) of the node N2 and the reference voltage V (N6) of the node N6, and outputs a control signal of H level to the control node N7, when the voltage V (N2) is equal to or lower than the reference voltage V (N6). Further, a signal voltage of an intermediate node between the switching element SW3 and the capacitor C2 is output to the control node N5 as a control signal.

When the charging of the input capacitor C1 is not completed, the voltage V (N2) of the node N2 in the synchronization period is lower than the reference voltage V (N6) of the node N6, and the voltage V (N2) of the node N2 in the burst signal period and the image signal period is higher than the clamp reference voltage V (N3) of the node N3, in the synchronization period, the comparator X1 of the first control circuit 32 outputs a control signal of H level to the control node N4, and the switching element SW1 of the switching circuit 34 becomes ON state. Further, the comparator X2 of the second control circuit 36 outputs a control signal of H level to the control node N7, and the switching element SW3 becomes ON state. As a result, the power supply potential Vdd and the capacitor C2 are connected to each other, and the capacitor C2 is charged. Further, the switching element SW2 becomes ON state, when the signal of the control node N5 exceeds the threshold voltage Vt of the switching element SW2 of the switching circuit 34. In the synchronization period, the switching elements SW1 and SW2 of the switching circuit 34 are turn to ON state, and the current (the clamp current) I1 supplied from the current source I1 is supplied to the node N2, and whereby the input capacitor C1 is charged.

Further, in the burst signal period and the image signal period, the comparator X1 of the first control circuit 32 outputs a control signal of L level to the control node N4, and the switching element SW1 of the switching circuit 34 becomes OFF state. Further, the comparator X2 of the second control circuit 36 outputs a control signal of L level to the control node N7. As a result, the switching element SW3 becomes OFF state, and the power supply potential Vdd and the capacitor C2 are disconnected. In the period after the charges stored between both ends of the capacitor C2 are discharged, and before the voltage V (N5) of the control node N5 becomes lower than the threshold voltage Vt of the switching element SW2, the switching element SW2 maintains the ON state, and the current (the clamp current) I1 supplied from the current source I1 is supplied to the node N2, whereby the input capacitor C1 is charged.

As described above, in the burst signal period and the image signal period, even after the switching element SW1 of the switching circuit 34 becomes OFF state, in the period before the voltage V (N5) of the control node N5 becomes lower than the threshold voltage Vt of the switching element SW2, the switching element SW2 maintains the ON state, and the input capacitor C1 is charged by the current I1. Accordingly, the present exemplary embodiment may extend the charging period of the input capacitor C1 per cycle of the video signal, and may decrease the number of cycles of the video signal required for the charging of the input capacitor C1 to be completed.

Therefore, the present exemplary embodiment may shorten the charging time required for charging the input capacitor C1, without decreasing the capacitance of the input capacitor C1 and without increasing the clamp current I1 required for charging.

Further, in the clamp circuit 30 of the present exemplary embodiment, the width (duration) of the charging period in one cycle may be changed by the settings of the capacitance value of the capacitor C2 and the resistance value of the resistor R1, and does not require another control signal (for example, a control signal or the like input from the outside of the clamp circuit 30).

Further, in the clamp circuit 30 of the present exemplary embodiment, when the charging of the input capacitor C1 is completed, the voltage V (N2) of the node N2 in the synchronization period is higher than the reference voltage V (N6) of the node N6 and lower than the clamp reference voltage V (N3) of the node N3, and the voltage V (N2) of the node N2 in the burst signal period and the image signal period is higher than the clamp reference voltage V (N3) of the node N3, in the synchronization period, the comparator X1 of the first control circuit 32 outputs a control signal of H level to the control node N4, and the switching element SW1 of the switching circuit 34 becomes ON state. Further, the comparator X2 of the second control circuit 36 outputs a control signal of L level to the control node N7, the switching element SW3 maintains the OFF state, and the control signal output to the control node N5 is L level. Accordingly, the switching element SW2 is maintained in the OFF state. In the synchronization period, the switching element SW1 of the switching circuit 34 becomes ON state, the current (the clamp current) I1 supplied from the current source I1 is supplied to the node N2, and the input capacitor C1 is charged.

Further, in the burst signal period and the image signal period, the comparator X1 of the first control circuit 32 outputs a control signal of L level to the control node N4, and the switching element SW1 of the switching circuit 34 becomes OFF state. On the other hand, in the second control circuit 36, since both the control signals output to the control nodes N7 and N5 are in L level, the switching element SW2 maintains the OFF state.

Accordingly, when the charging of the input capacitor C1 is completed, in the second control circuit 36 in the synchronization period, since the switching element SW3 is maintained in the OFF state, the charging of the capacitor C2 is not performed. Accordingly, when the synchronization period ends, both the switching elements SW1 and SW2 turn to the OFF state, and the charging of the input capacitor C1 is not performed. Namely, in the present exemplary embodiment, since the reference voltage V (N6) is set lower than the clamp reference voltage V (N3), and specifically, set lower than the lowest voltage (see FIG. 7) of the voltage V (N2) of the node N2 in the synchronization period, after clamping, in the second control circuit 36, the control signal of the control node N5 is always in L level, and the switching element SW2 is maintained in the OFF state.

Therefore, in the present exemplary embodiment, since the input capacitor C1 is charged only in the synchronization period, it is possible to prevent overcharging the input capacitor C1.

In the present exemplary embodiment, as an example, a case in which the second control circuit 36 is configured to include the resistor RE the capacitor C2, and the switching element SW3, has been described. However, the present invention is not limited thereto. The second control circuit 36 may be a circuit using a counter, capable of maintaining a control level of the switching element SW2 for a predetermined period, and the configuration thereof is not particularly limited.

[Second Exemplary Embodiment]

Hereinafter, a signal processing system (a semiconductor device and a clamp circuit) and a clamp operation according to a second exemplary embodiment of the present invention will be described in detail with reference to the drawings. The signal processing system and the clamp operation of the present exemplary embodiment has substantially the same configuration and operation as the first exemplary embodiment. Accordingly, portions of which the configuration and operation that are substantially the same as those of the first exemplary embodiment will be applied with the same reference numerals, and detailed description thereof will be omitted.

Figure 8:
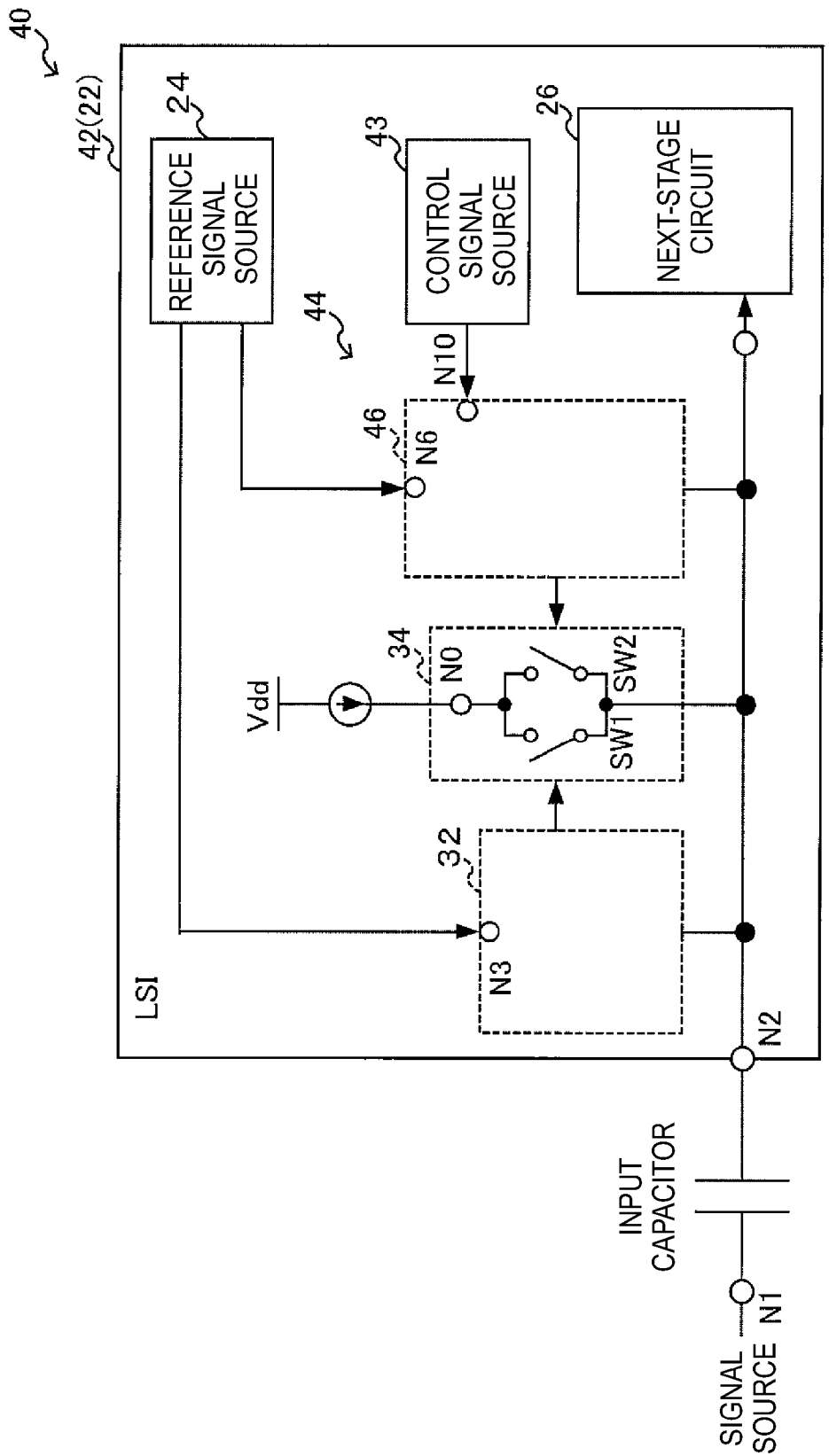
FIG. 8 is a schematic configuration diagram illustrating a signal processing system including a clamp circuit according to a second exemplary embodiment.

First, a configuration of a signal processing system of the present exemplary embodiment will be described. An example of a schematic configuration of the signal processing system of the present exemplary embodiment is illustrated in FIG. 8. In a signal processing system 40 illustrated in FIG. 8, the configuration and operation of a second control circuit 46 of a clamp circuit 44 of a semiconductor device 42 in the signal processing system 40 are different from those of the second control circuit 36 of the clamp circuit 30 of the semiconductor device 20 in the signal processing system 10 of the first exemplary embodiment. Further, the semiconductor device 42 of the present exemplary embodiment includes a control signal source 43 that outputs a control signal N10 to the second control circuit 46.

Figure 9:
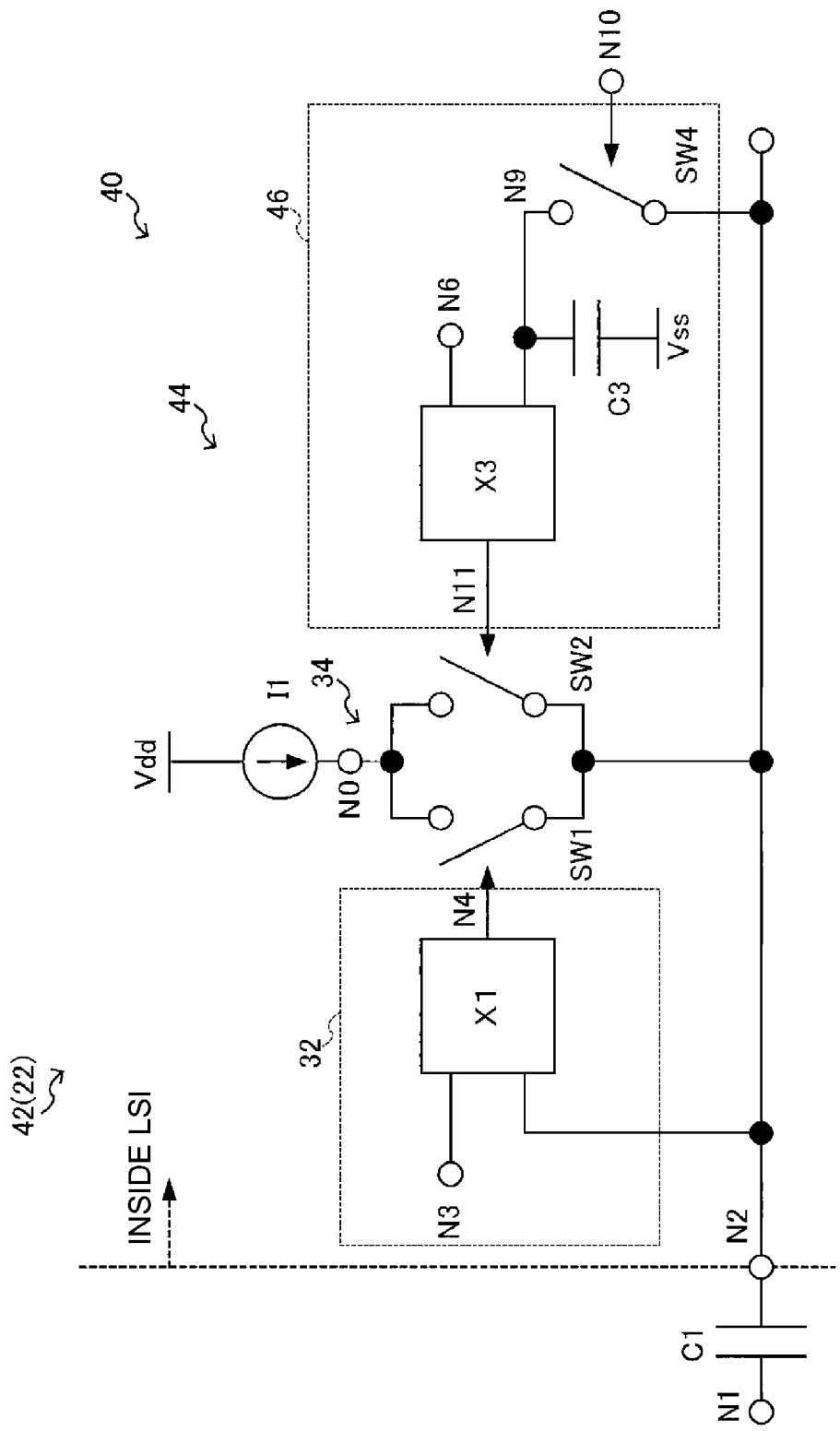
FIG. 9 is a circuit diagram illustrating an example of the clamp circuit according to the second exemplary embodiment.

A circuit diagram of an example of the clamp circuit 44 of the present exemplary embodiment is illustrated in FIG. 9. In the clamp circuit 44 of the present exemplary embodiment, as described above, since the configuration and operation of the second control circuit 46 are different from those of the second control circuit 36 of the clamp circuit 30 of the first exemplary embodiment, the configuration of the second control circuit 46 will be described.

The second control circuit 46 of the present exemplary embodiment is configured to include a comparator X3, a switching element SW4, and a capacitor C3. The comparator X3 compares the reference voltage V (N6) of the node N6 and a signal voltage of a node N9, and outputs a control signal of H level to a node N11 when the reference voltage V (N6) is higher than the signal voltage. The switching element SW4 connects the node N9 and the node N2. The capacitor C3 is provided between the node N9 and the ground potential Vss. The ON/OFF of the switching element SW4 is controlled by the control signal of the control node N10 (a control signal of H level turns ON the switching element SW4).

Next, a clamp operation of the clamp circuit 44 of the present exemplary embodiment and the voltages of respective nodes (including the control node) will be described.

Figure 10:
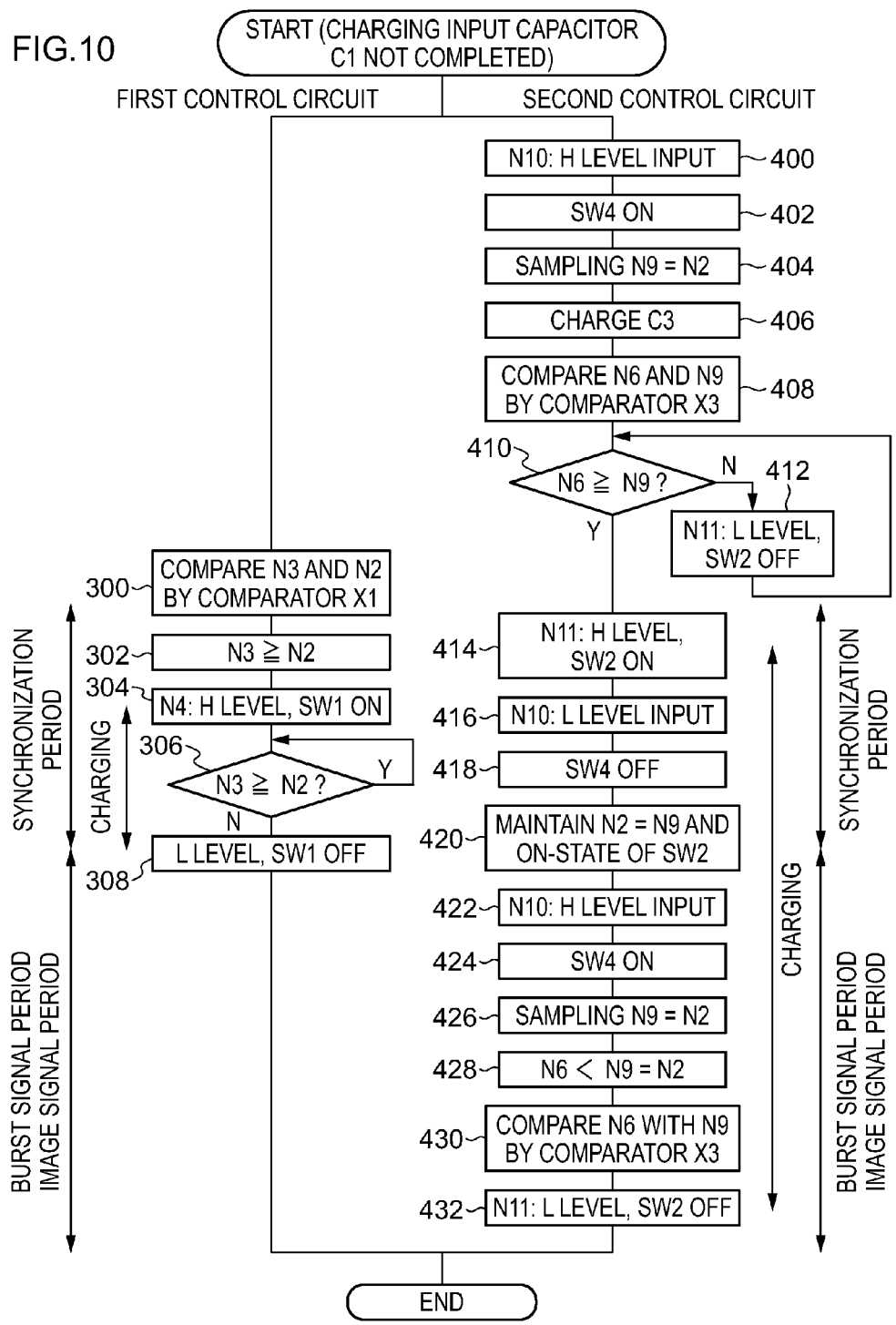
FIG. 10 is a flowchart illustrating a clamp operation of the clamp circuit, when the charging of the input capacitor C1 is not completed, according to the second exemplary embodiment.

First, a clamp operation and voltages of respective nodes when the charging of the input capacitor C1 is not completed, will be described. FIG. 10 illustrates a flowchart of an example of a clamp operation of the clamp circuit 44, when the charging of the input capacitor C1 is not completed. Further, FIG. 11 illustrates an example of voltages of respective nodes of the clamp circuit 44.

Figure 11:
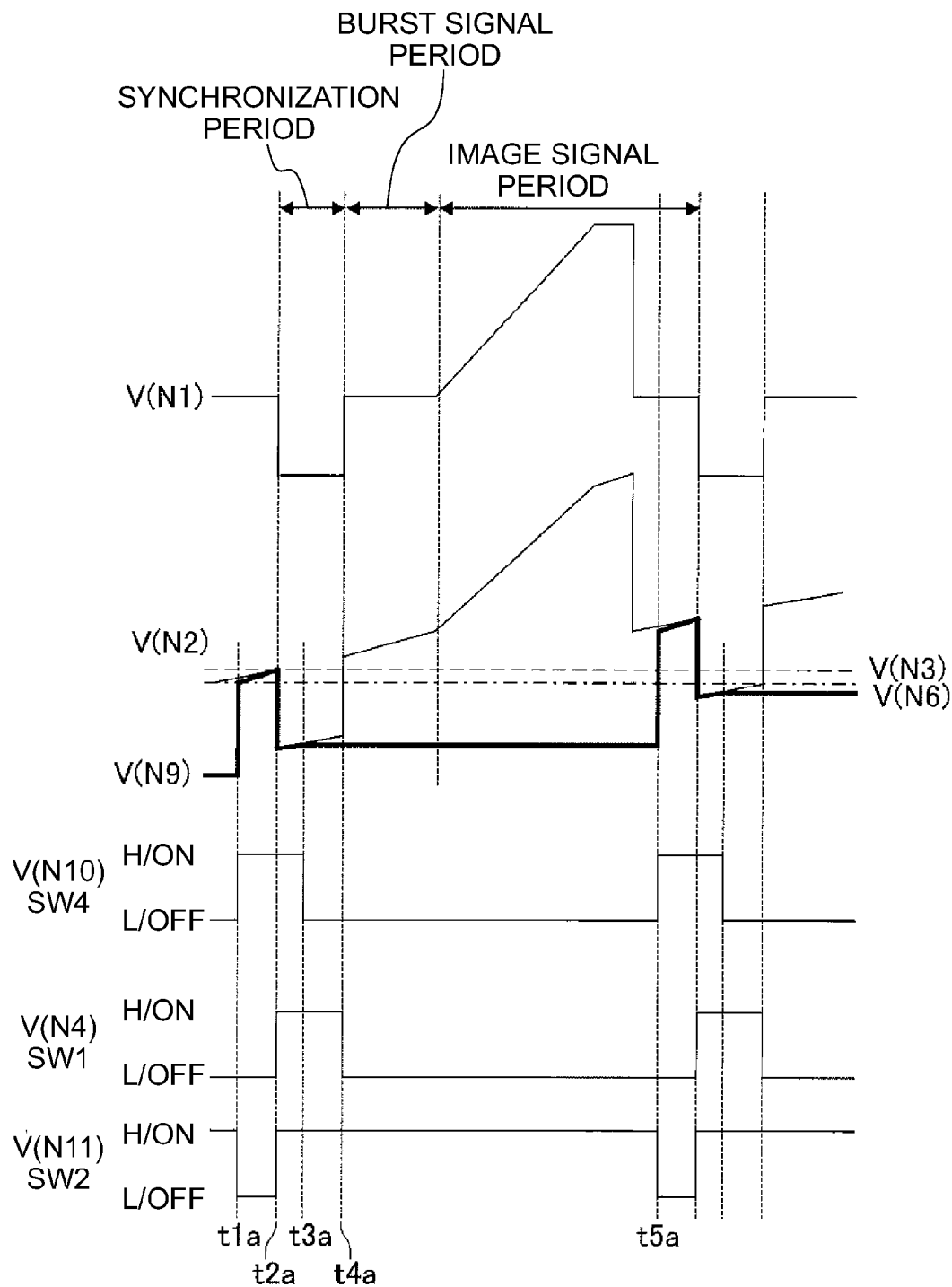
FIG. 11 is a diagram illustrating voltages of respective nodes of the clamp circuit, when the charging of the input capacitor C1 is not completed, according to the second exemplary embodiment.

As illustrated in FIG. 11, when the charging of the input capacitor C1 is not completed, the voltage V (N2) of the node N2 in the synchronization period is lower than the reference voltage V (N6) of the node N6. Further, the voltage V (N2) of the node N2 in the burst signal period and the image signal period is higher than the clamp reference voltage V (N3) of the node N3.

The operation of the first control circuit 32 of the clamp circuit 44 is substantially the same as the operation of the first exemplary embodiment, when the charging of the input capacitor C1 is not completed. In the synchronization period, the comparator X1 compares the clamp reference voltage V (N3) of the node N3 and the voltage V (N2) of the node N2 (FIG. 10: step 300). Since the clamp reference voltage V (N3) is equal to or higher than the voltage V (N2) of the node N2 (FIG. 10: step 302), a control signal of H level is output from the comparator X1 to the control node N4, and the switching element SW1 becomes ON state (FIG. 10: step 304, FIG. 11: timing t2a).

Next, the operation of the second control circuit 46 of the clamp circuit 44 will be described. In the second control circuit 46, before the synchronization period starts, a control signal of H level is input to the control node N10 from the outside of the clamp circuit 44 (FIG. 10: step 400), and the switching element SW4 becomes ON state (FIG. 10: step 402, FIG. 11: timing t1a).

When the switching element SW4 becomes ON state, the voltage V (N2) of the node N2 is sampled to the voltage V (N9) of the node N9(V(N2)=V(N9), FIG. 10: step 404), and the capacitor C3 is charged (FIG. 10: step 406). The comparator X3 compares the reference voltage V (N6) of the node N6 and the voltage V (N9) of the node N9 (FIG. 10: step 408). When the reference voltage V (N6) is lower than the voltage V (N9) of the node N9 (FIG. 10: negative determination in step 410), a control signal of L level is output to the control node N11, and the switching element SW2 is maintained in the OFF state (FIG. 10: step 412, FIG. 11: period between timing t1a and timing t2a).

In the second control circuit 46, when the synchronization period starts, since the reference voltage V (N6) is equal to or higher than the voltage V (N2) of the node N2, and is equal to or higher than the voltage V (N9) of the node N9 (FIG. 4: affirmative determination in step 410), a control signal of H level is output from the comparator X3 to the control node N11, and the switching element SW2 becomes ON state (FIG. 4: step 414, FIG. 11: timing t2a).

Accordingly, at timing t1a, the switching element SW1 controlled by the first control circuit 32 becomes ON state, and the input capacitor C1 is charged by the current I1 supplied from the current source I1. Further, at timing t2a, the switching element SW2 controlled by the second control circuit 46 also becomes ON state, and the input capacitor C1 is charged by the current I1 supplied from the current source I1.

In the synchronization period of the video signal, in the first control circuit 32, since the voltage V (N2) of the node N2<the reference voltage V (N6)<the clamp reference voltage V (N3) (FIG. 10: affirmative determination in step 306, FIG. 11: period between timing t2a and timing t4a), the voltage V (N4) of the control node N4 becomes H level, the switching element SW1 of the switching circuit 34 becomes ON state, and the input capacitor C1 is charged by the current I1 supplied from the current source I1.

On the other hand, in the second control circuit 36, in the synchronization period, a control signal of L level is input to the control node N10 from the outside of the clamp circuit 44 (FIG. 10: step 416), and the switching element SW4 becomes OFF state (FIG. 10: step 418, FIG. 11: timing t3a).

When the switching element SW4 becomes OFF state, the voltage V(N9)(V(N2)=V(N9)) of the node N9 sampled to the node N2 is maintained by the capacitor C3. In this case, since the voltage V (N2) of the node N2=the voltage V (N9) of the node N9<the reference voltage V (N6), the control signal of the node N11 maintains H level. Accordingly, the ON state of the switching element SW2 is maintained (FIG. 10: step 420, FIG. 11: period between timing t3a and timing t5a).

When the synchronization period of the video signal ends, and the burst signal period and the image signal period start (FIG. 11: period starting from timing t4a), since the reference voltage V (N6)<the clamp reference voltage V (N3)<the voltage V (N2) of the node N2 (FIG. 10: negative determination in step 306), the comparator X1 of the first control circuit 32 outputs a control signal of L level to the control node N4. As a result, the switching element SW1 of the switching circuit 34 becomes OFF state (FIG. 10: step 308, FIG. 11: timing t4a).

On the other hand, in the second control circuit 46, since the switching element SW4 is in the OFF state as described above, the voltage V (N2) of the node N2=the voltage V (N9) of the node N9, is maintained by the capacitor C3, and the control signal of the node N11 is maintained in H level, and the ON state of the switching element SW2 is maintained (FIG. 10: step 420, FIG. 11: period between timing t3a and timing t5a).

There after, in the second control circuit 46, in the burst signal period and the image signal period, a control signal of H level is input to the control node N10 from the outside of the clamp circuit 44 (FIG. 10: step 422), and the switching element SW4 becomes ON state (FIG. 10: step 424, FIG. 11: timing t5a).

When the switching element SW4 becomes ON state, the voltage V (N2) of the node N2 is sampled to the voltage V (N9) of the node N9(V(N2)=V(N9), FIG. 10: step 426). In this case, since the reference voltage V (N6)<the voltage V (N2) of the node N2=the voltage V (N9) of the node N9 (FIG. 10: step 428), the comparator X3 compares the reference voltage V (N6) of the node N6 and the voltage V (N9) of the node N9 (FIG. 10: step 430), and the control signal of the node N11 becomes L level, and the switching element SW2 becomes OFF state (FIG. 10: step 432, FIG. 11: timing t5a).

Since the switching element SW1 is already in the OFF state, and the switching element SW2 also becomes OFF state, and no current is supplied from the current source I1 to the node N2. Accordingly, the charging of the input capacitor C1 stops.

Figure 12:
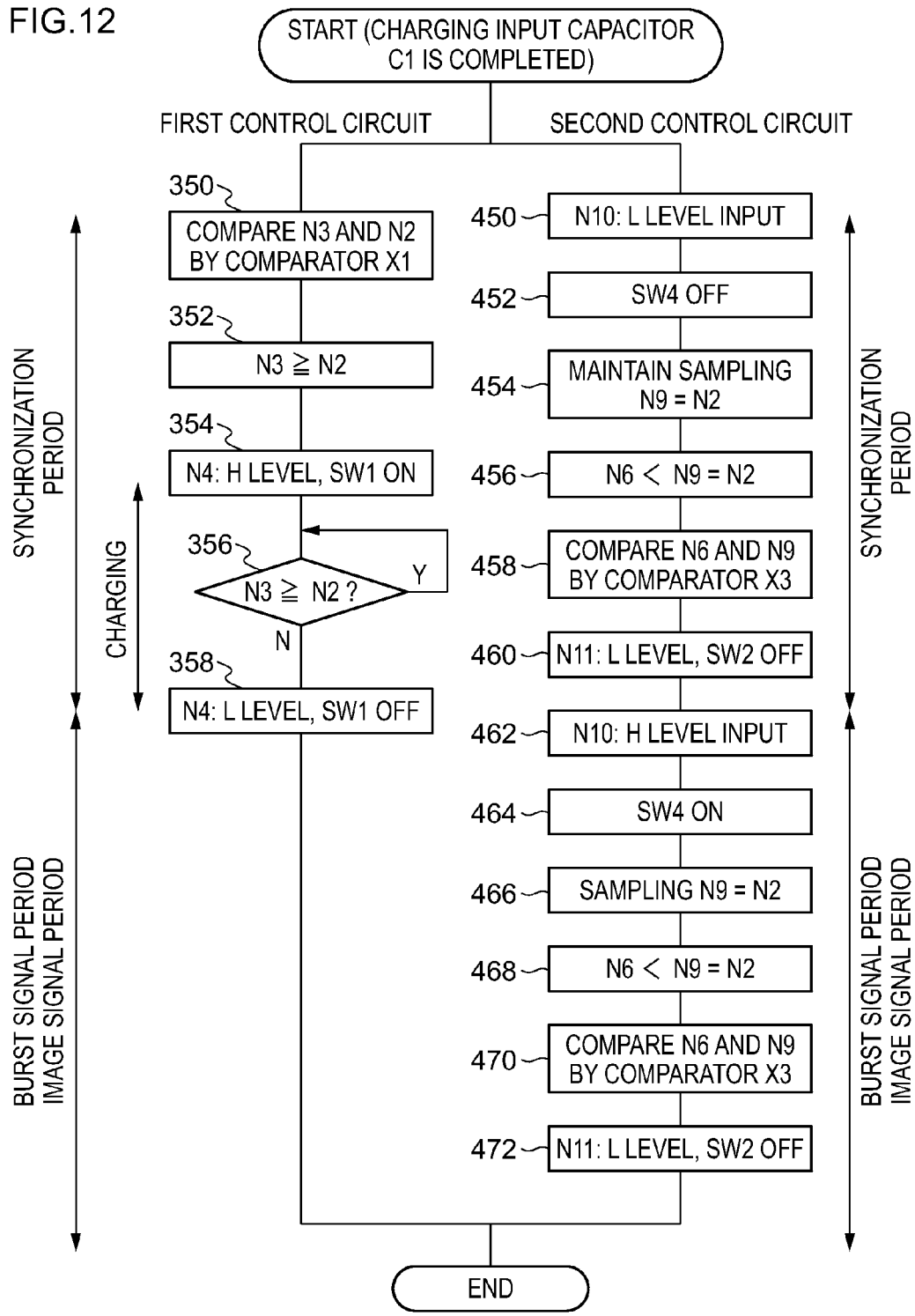
FIG. 12 is a flowchart illustrating a clamp operation of the clamp circuit, when the charging of the input capacitor C1 is completed, according to the second exemplary embodiment.

Next, the clamp operation and the voltages of respective nodes, when the charging of the input capacitor C1 is completed, will be described. FIG. 12 illustrates a flowchart of an example of the flow of a clamp operation in the clamp circuit 44, when the charging of the input capacitor C1 is completed. Further, FIG. 13 illustrates an example of the voltages of respective nodes of the clamp circuit 44.

Figure 13:
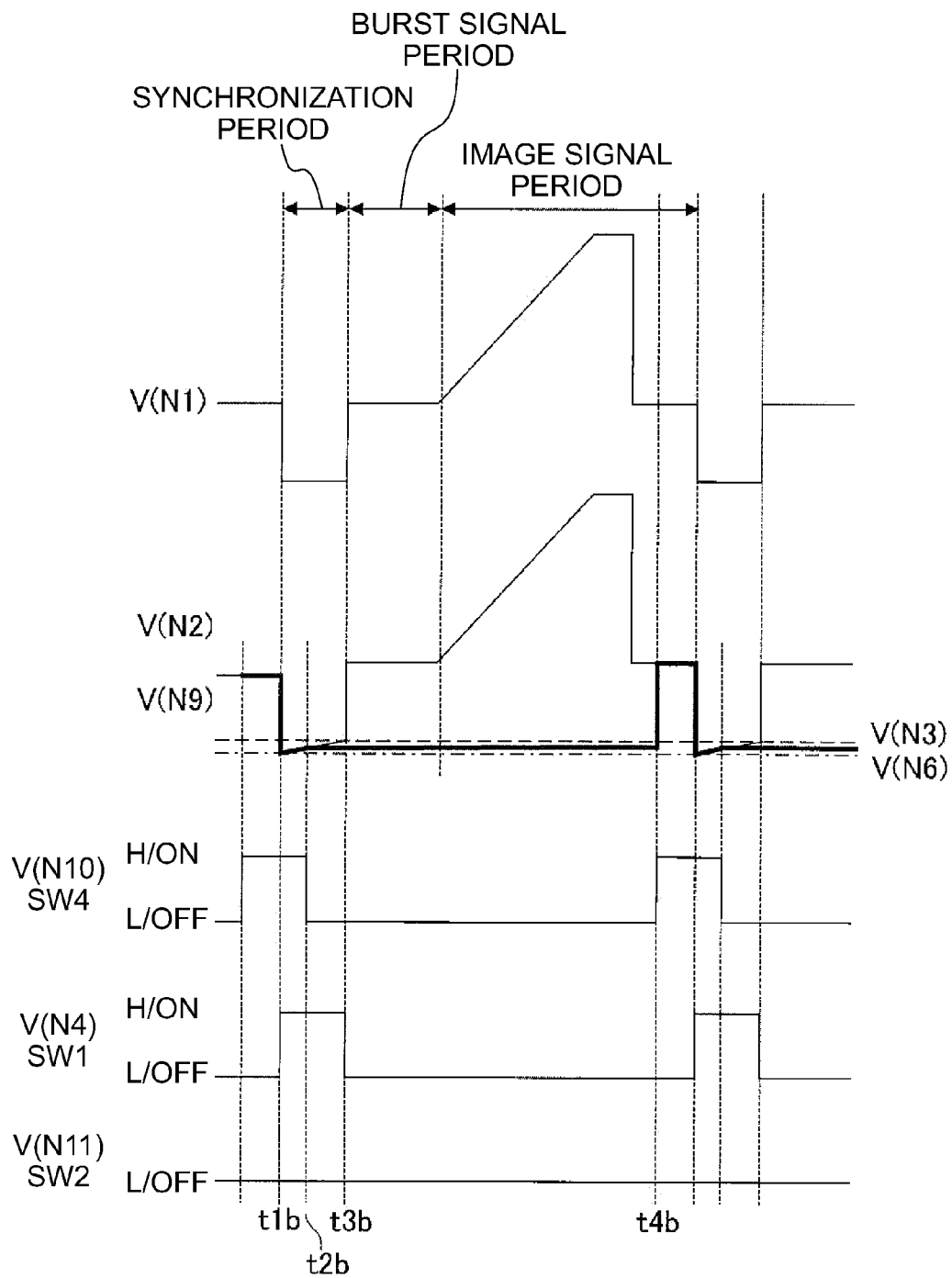
FIG. 13 is a diagram illustrating voltages of respective nodes of the clamp circuit, when the charging of the input capacitor C1 is completed, according to the second exemplary embodiment.

As illustrated in FIG. 13, when the charging of the input capacitor C1 is completed, the voltage V (N2) of the node N2 in the synchronization period is higher than the reference voltage V (N6) of the node N6, and is lower than the clamp reference voltage V (N3) of the node N3. Further, the voltage V (N2) of the node N2 in the burst signal period and the image signal period is higher than the clamp reference voltage V (N3) of the node N3.

The operation of the first control circuit 32 of the clamp circuit 44 is substantially the same as in the first exemplary embodiment, when the charging of the input capacitor C1 is completed. In the synchronization period, the comparator X1 compares the clamp reference voltage V (N3) of the node N3 and the voltage V (N2) of the node N2 (FIG. 12: step 350). Since the clamp reference voltage V (N3) is equal to or higher than the voltage V (N2) of the node N2 (FIG. 12: step 352), a control signal of H level is output from the comparator X1 to the control node N4, and the switching element SW1 becomes ON state (FIG. 12: step 354, FIG. 13: timing t1b).

The operation of the second control circuit 46 of the clamp circuit 44 will be described. In the second control circuit 46, in the synchronization period, a control signal of L level is input to the control node N10 from the outside of the clamp circuit 44 (FIG. 12: step 450), and the switching element SW4 becomes OFF state (FIG. 12: step 452, FIG. 13: timing t2b).

When the switching element SW4 becomes OFF state, the voltage V (N2) of the node N2 which was sampled to the voltage V (N9) of the node N9 is maintained (V(N2)=V (N9)) (FIG. 12: step 454). In this case, since the reference voltage V (N6)<the voltage V (N2) of the node N2=the voltage V (N9) of the node N9 (FIG. 12: step 456), the comparator X3 compares the reference voltage V (N6) of the node N6 and the voltage V (N9) of the node N9 (FIG. 12: step 458), and the control signal of the node N11 becomes L level and the switching element SW2 is maintained in the OFF state (FIG. 12: step 460, FIG. 13: timing t2b).

Accordingly, in the synchronization period of the video signal, at timing t1b, the switching element SW1 controlled by the first control circuit 32 becomes ON state, and the input capacitor C1 is charged by the current I1 supplied from the current source I1. On the other hand, although the switching element SW2 controlled by the second control circuit 46 is maintained in the OFF state, since the switching element SW1 is in the ON state, the input capacitor C1 is charged by the current I1 supplied from the current source I1.

When the synchronization period of the video signal ends, and the burst signal period and the image signal period start (FIG. 13: period starting from timing t3b), becomes, the reference voltage V (N6)<the clamp reference voltage V (N3) <the voltage V (N2) of the node N2 (FIG. 12: negative determination in step 356). Accordingly, the comparator X1 of the first control circuit 32 outputs a control signal of L level to the control node N4. As a result, the switching element SW1 of the switching circuit 34 becomes OFF state (FIG. 12: step 358, FIG. 13: timing t3b).

On the other hand, in the second control circuit 46, as described above, during the period in which the switching element SW4 changes from the OFF state to the ON state, the voltage V (N2) of the node N2, that is equal to the voltage V (N9) of the node N9, is maintained, the control signal of the node N11 is maintained in L level, and the OFF state of the switching element SW2 is maintained (FIG. 13: period between timing t2b and timing t4b).

In the second control circuit 46, in the burst signal period and the image signal period, a control signal of H level is input to the control node N10 from the outside of the clamp circuit 44 (FIG. 12: step 462), and the switching element SW4 becomes ON state (FIG. 12: step 464, FIG. 13: timing t4b).

When the switching element SW4 becomes ON state, the voltage V (N2) of the node N2 is sampled to the voltage V (N9) of the node N9(V(N2)=V(N9), FIG. 12: step 466). In this case, since the reference voltage V (N6)<the voltage V (N2) of the node N2=the voltage V (N9) of the node N9 (FIG. 12: step 468), the comparator X3 compares the reference voltage V (N6) of the node N6 and the voltage V (N9) of the node N9 (FIG. 12: step 470), and the control signal of the node N11 becomes L level, and the switching element SW2 maintains the OFF state (FIG. 12: step 472, FIG. 13: timing t4b).

Since the switching element SW1 is already in the OFF state, and the switching element SW2 also in the OFF state, no current is supplied from the current source I1 to the node N2. Accordingly, the charging of the input capacitor C1 stops.

As described above, in the burst signal period and the image signal period, since both the switching elements SW1 and SW2 of the switching circuit 34 are in the OFF state, no current I1 is supplied from the current source I1, and the input capacitor C1 is not charged.

As described above, the clamp circuit 44 in the semiconductor device 42 of the signal processing system 40 of the present exemplary embodiment includes the first control circuit 32, the switching circuit 34, and the second control circuit 46. The switching circuit 34 includes the switching elements SW1 and SW2 that are connected in parallel between the current source I1 and the node N2 (the input capacitor C1), and that are turn to the ON state in accordance with the control signal of H level. The first control circuit 32 includes the comparator X1 that compares the voltage V (N2) of the node N2 and the clamp reference voltage V (N3) of the node N3, and outputs a control signal of H level to the control node N4, when the voltage V (N2) is equal to or lower than the clamp reference voltage V (N3). Further, the second control circuit 46 includes the comparator X3 that compares the reference voltage V (N6) of the node N6 and the voltage V (N9) of the node N9, and that outputs a control signal to the control node N11, the capacitor C3 connected to the node N9, and the switching element SW4 that connects the node N9 and the node N2. The switching element SW4 is controlled in accordance with a control signal input to the control node N10 from the outside of the clamp circuit 44, so that the switching element SW4 becomes ON state when the control signal becomes H level. The comparator X3 compares the voltage V (N9) of the node N9 and the reference voltage V (N6) of the node N6, and outputs a control signal of H level to the control node N11, when the voltage V (N9) is equal to or lower than the reference voltage V (N6).

When the charging of the input capacitor C1 is not completed, the voltage V (N2) of the node N2 in the synchronization period is lower than the reference voltage V (N6) of the node N6, and the voltage V (N2) of the node N2 in the burst signal period and the image signal period is higher than the clamp reference voltage V (N3) of the node N3, in the synchronization period, the comparator X1 of the first control circuit 32 outputs a control signal of H level to the control node N4, and the switching element SW1 of the switching circuit 34 becomes ON state.

Further, in the second control circuit 46, a control signal of H level is input to the control node N10 from the outside of the clamp circuit 44, the switching element SW4 becomes ON state, and the voltage V (N9) of the node N9 becomes equal to the voltage V (N2) of the node N2. Since, the voltage V (N9) of the node N9=the voltage V (N2) of the node N2<the reference voltage V (N6) of the node N6, the comparator X3 outputs a control signal of H level to the control node N11, and the switching element SW2 becomes ON state. In the synchronization period, the switching elements SW1 and SW2 of the switching circuit 34 become ON state, and the current (the clamp current) I1 supplied from the current source I1 is supplied to the node N2, whereby the input capacitor C1 is charged.

Further, in the synchronization period, in the second control circuit 46, a control signal of L level is input to the control node N10 from the outside of the clamp circuit 44, the switching element SW4 becomes OFF state, and the voltage V (N9) of the node N9=the voltage V (N2) of the node N2 is maintained by the capacitor C3. In this case, since the voltage V (N9) of the node N9=the voltage V (N2) of the node N2<the reference voltage V (N6) of the node N6, the control node N11 maintains the control signal of H level, and maintains the ON state of the switching element SW2.

Furthermore, in the burst signal period and the image signal period, the comparator X1 of the first control circuit 32 outputs a control signal of L level to the control node N4, and the switching element SW1 of the switching circuit 34 becomes OFF state. Further, in the second control circuit 46, the switching element SW4 is maintained in the OFF state in accordance with the control signal of L level input to the control node N10, and the voltage V (N9) of the node N9=to the voltage V (N2) of the node N2<the reference voltage V (N6) of the node N6, is maintained by the capacitor C3. Accordingly, the control node N11 maintains the control signal of H level, maintains the switching element SW2 in the ON state, the current (the clamp current) I1 supplied from the current source I1 is supplied to the node N2, and the input capacitor C1 is charged.

As described above, in the burst signal period and the image signal period, even after the switching element SW1 of the switching circuit 34 becomes OFF state, the switching element SW2 is maintained in the ON state, and the input capacitor C1 is charged by the current I1. Accordingly, the present exemplary embodiment may extend the charging period of the input capacitor C1 per cycle of the video signal, and may decrease the number of cycles of the video signal required for finishing the charging of the input capacitor C1.

Therefore, similarly to the first exemplary embodiment, the present exemplary embodiment may shorten the charging time required for charging the input capacitor C1 without decreasing the capacitance of the input capacitor C1 and without increasing the clamp current I1 required for charging.

Further, the charging period of the switching element SW2 continues until a control signal of H level is input to the control node N10, in the burst signal period and the image signal period. Accordingly, the present exemplary embodiment may further extend the width (duration) of the charging period in one cycle.

Further, in the present exemplary embodiment, the adjustment of the charging period of the input capacitor C1, may be controlled by the control signal input to the node N10. Therefore, the present exemplary embodiment may extend the charging period in one cycle, and may shorten the charging time required for charging the input capacitor C1 without the need to increase the layout of the clamp circuit 44, as compared to the clamp circuit 30 of the first exemplary embodiment.

Further, when the charging of the input capacitor C1 is completed, in the second control circuit 46 in the synchronization period, the ON/OFF of the switching element SW4 is controlled based on the control signal input to the node N10, and the relation, reference voltage V (N6) of the node N6<the voltage V (N9) of the node N9=the voltage V (N2) of the node N2, is maintained. Accordingly, the control node N11 maintains the control signal to L level, and maintains the OFF state of the switching element SW2, the charging of the capacitor C2 is not performed. Further, when the synchronization period ends, since the switching element SW1 becomes OFF state and the switching element SW2 maintains the OFF state, the charging of the input capacitor C1 is not performed. Namely, in the present exemplary embodiment, similarly to the first exemplary embodiment, the reference voltage V (N6) is lower than the clamp reference voltage V (N3), and specifically, is set to be lower than the lowest voltage (see FIG. 11) of the voltage V (N2) of the node N2 in the synchronization period, after clamping. Therefore, in the second control circuit 46, the control signal of the control node N11 is always in L level, and the switching element SW2 maintains the OFF state.

Therefore, since the input capacitor C1 is charged only in the synchronization period, the present exemplary embodiment may prevent overcharging the input capacitor C1.

In the present exemplary embodiment, as an example, a case in which the second control circuit 46 is configured as a sample/hold (S/H) circuit using the capacitor C3 and the switching element SW4, has been described. However, the present invention is not limited thereto. The second control circuit 46 may be a circuit capable of maintaining the voltage V (N2) of the node N2, and the configuration thereof is not particularly limited.

[Third Exemplary Embodiment]

Hereinafter, a signal processing system (a semiconductor device and a clamp circuit) and a clamp operation according to a third exemplary embodiment of the present invention will be described in detail with reference to the drawings. The signal processing system and the clamp operation of the present exemplary embodiment include substantially the same configuration and operation as the first and second exemplary embodiments. Accordingly, portions of which the configuration and operation are substantially the same as those of the first and second exemplary embodiments will be applied with the same reference numerals, and detailed description thereof will be omitted.

Figure 14:
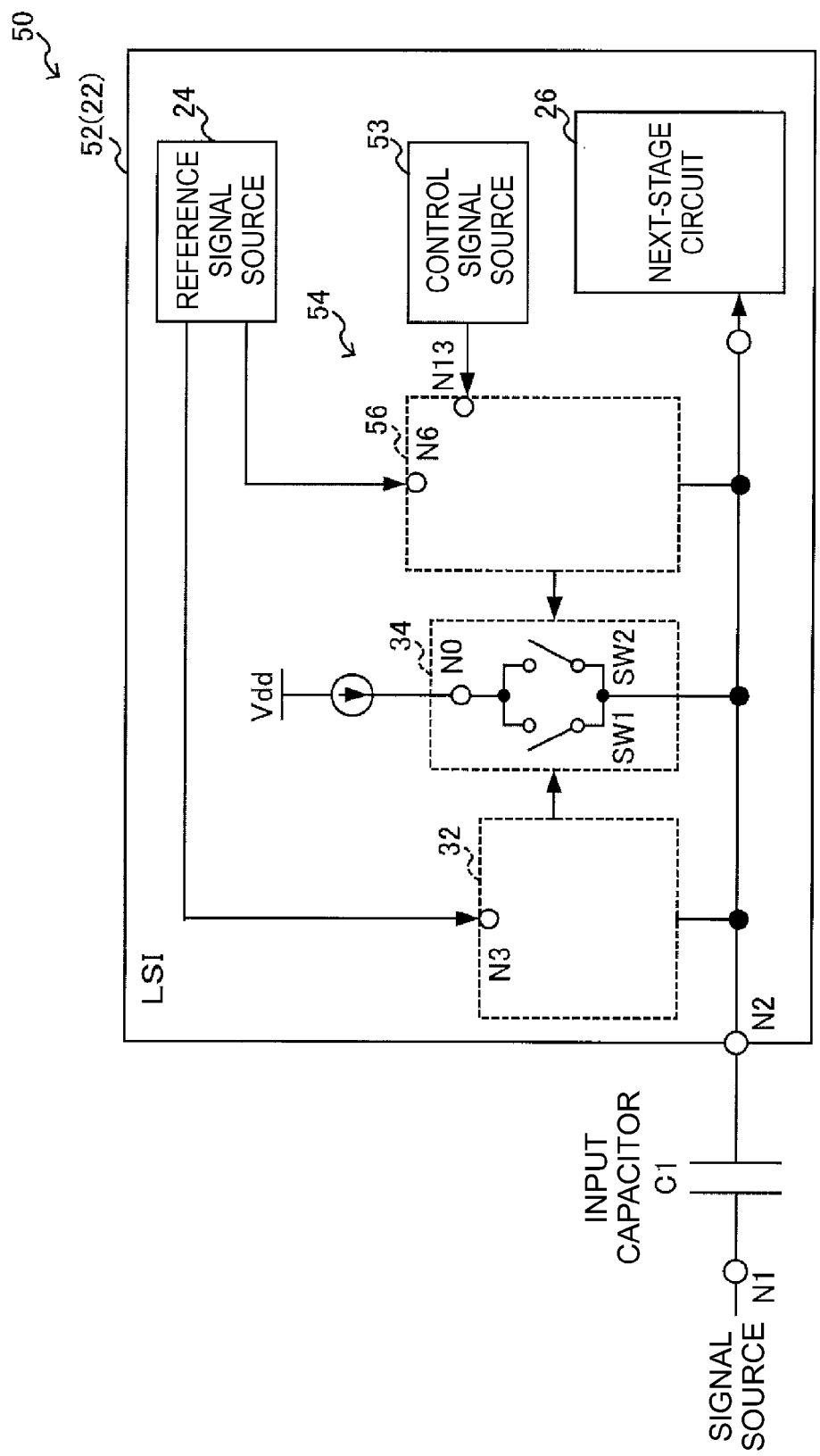
FIG. 14 is a schematic configuration diagram illustrating a signal processing system including a clamp circuit according to a third exemplary embodiment.

First, a configuration of a signal processing system of the present exemplary embodiment will be described. An example of a schematic configuration of the signal processing system of the present exemplary embodiment is illustrated in FIG. 14. In a signal processing system 50 illustrated in FIG. 14, the configuration and operation of a second control circuit 56 of a clamp circuit 54 of a semiconductor device 52 in the signal processing system 50 are different from those of the first and second exemplary embodiments. Further, the semiconductor device 52 of the present exemplary embodiment includes a control signal source 53 that outputs a control signal N13 to the second control circuit 56.

Figure 15:
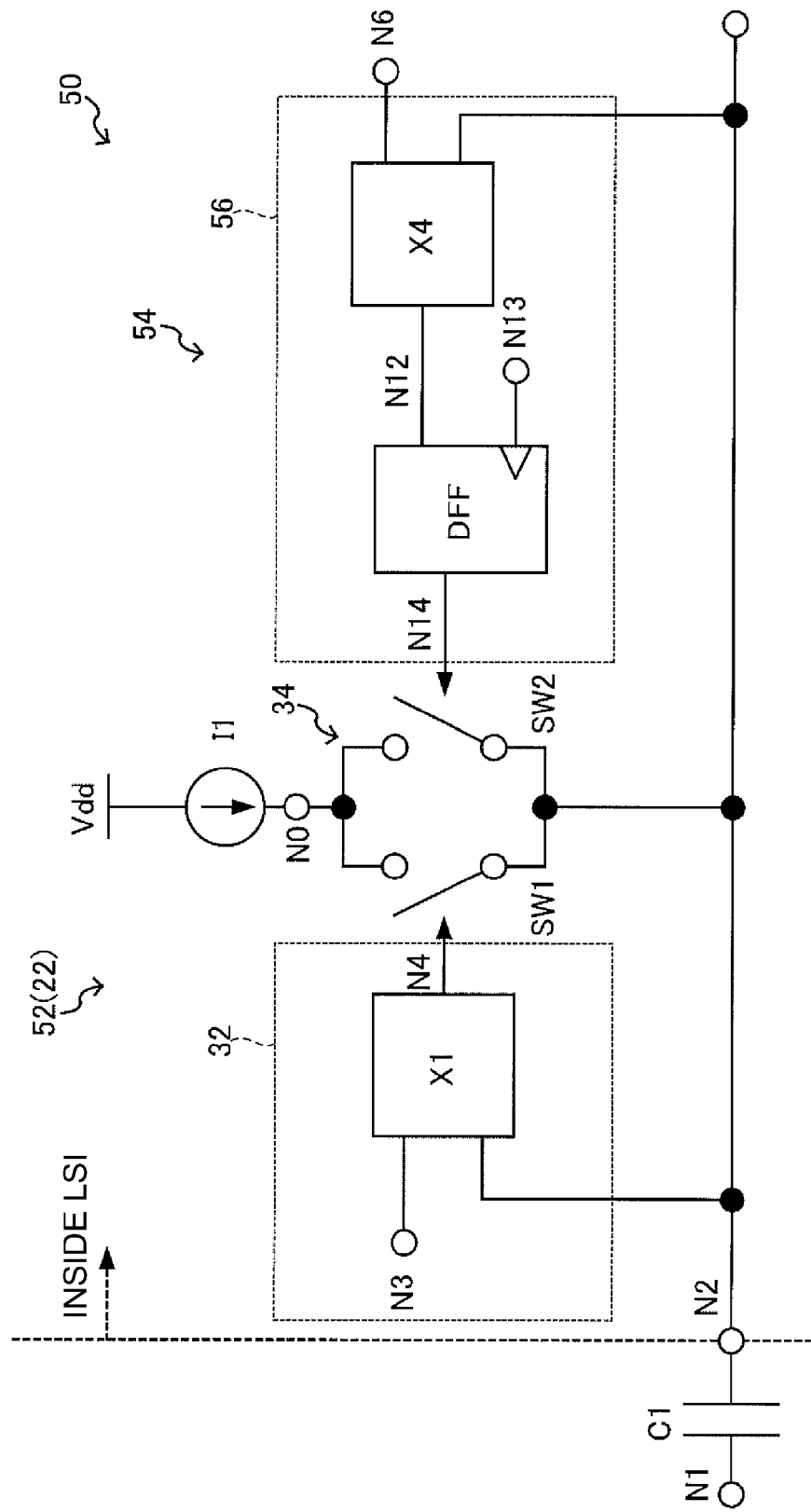
FIG. 15 is a circuit diagram illustrating an example of the clamp circuit according to the third exemplary embodiment.

A circuit diagram of an example of the clamp circuit 54 of the present exemplary embodiment is illustrated in FIG. 15. In the clamp circuit 54 of the present exemplary embodiment, as described above, since the configuration and operation of the second control circuit 56 are different from those of the first and second exemplary embodiments, the configuration of the second control circuit 56 will be described.

The second control circuit 56 of the present exemplary embodiment is configured to include a comparator X4 and a D-flip flop (DFF). The comparator X4 compares the reference voltage V (N6) of the node N6 and the voltage V (N2) of the node N2, and outputs a control signal of H level to the node N12, when the reference voltage V (N6) is higher than the voltage V (N2). The DFF receives a signal output to the node N12 as input data, receives a signal of the control node N13 as input control signal, and outputs a signal to the control node N14 of the switching element SW2. Namely, the DFF has a function of outputting and maintaining, to the control node N14, a signal state of the node N12 at the rising timing of the control signal (pulse) of the control node N13.

Next, a clamp operation by the clamp circuit 54 of the present exemplary embodiment and the voltages of respective nodes (including the control node) will be described.

Figure 16:
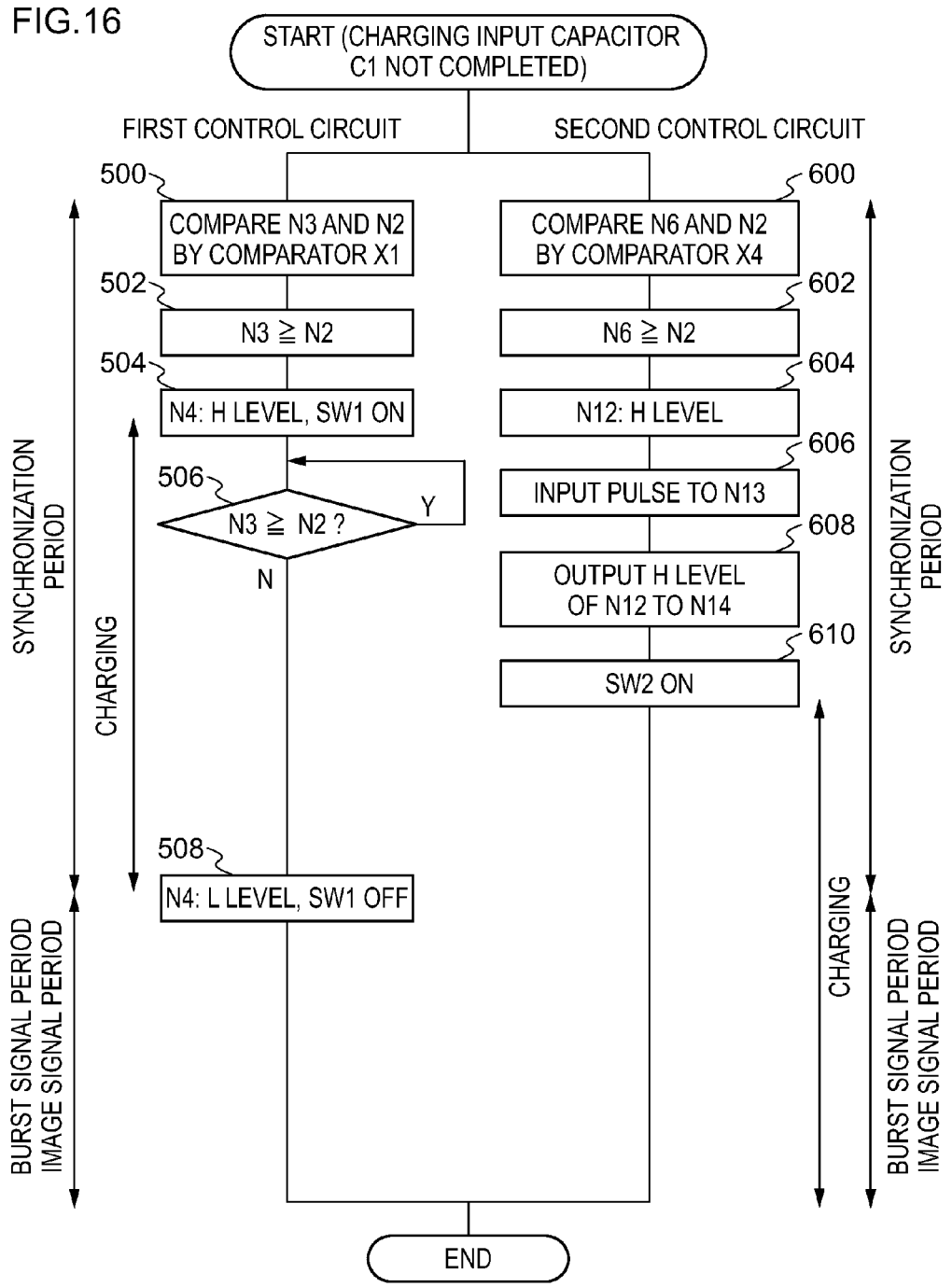
FIG. 16 is a flowchart illustrating a clamp operation of the clamp circuit, when the charging of the input capacitor C1 is not completed, according to the third exemplary embodiment.

First, a clamp operation and voltages of respective nodes, when the charging of the input capacitor C1 is not completed, will be described. FIG. 16 illustrates a flowchart of an example of a clamp operation of the clamp circuit 54, when the charging of the input capacitor C1, is not completed. Further, FIG. 17 illustrates an example of voltages of respective nodes of the clamp circuit 54.

Figure 17:
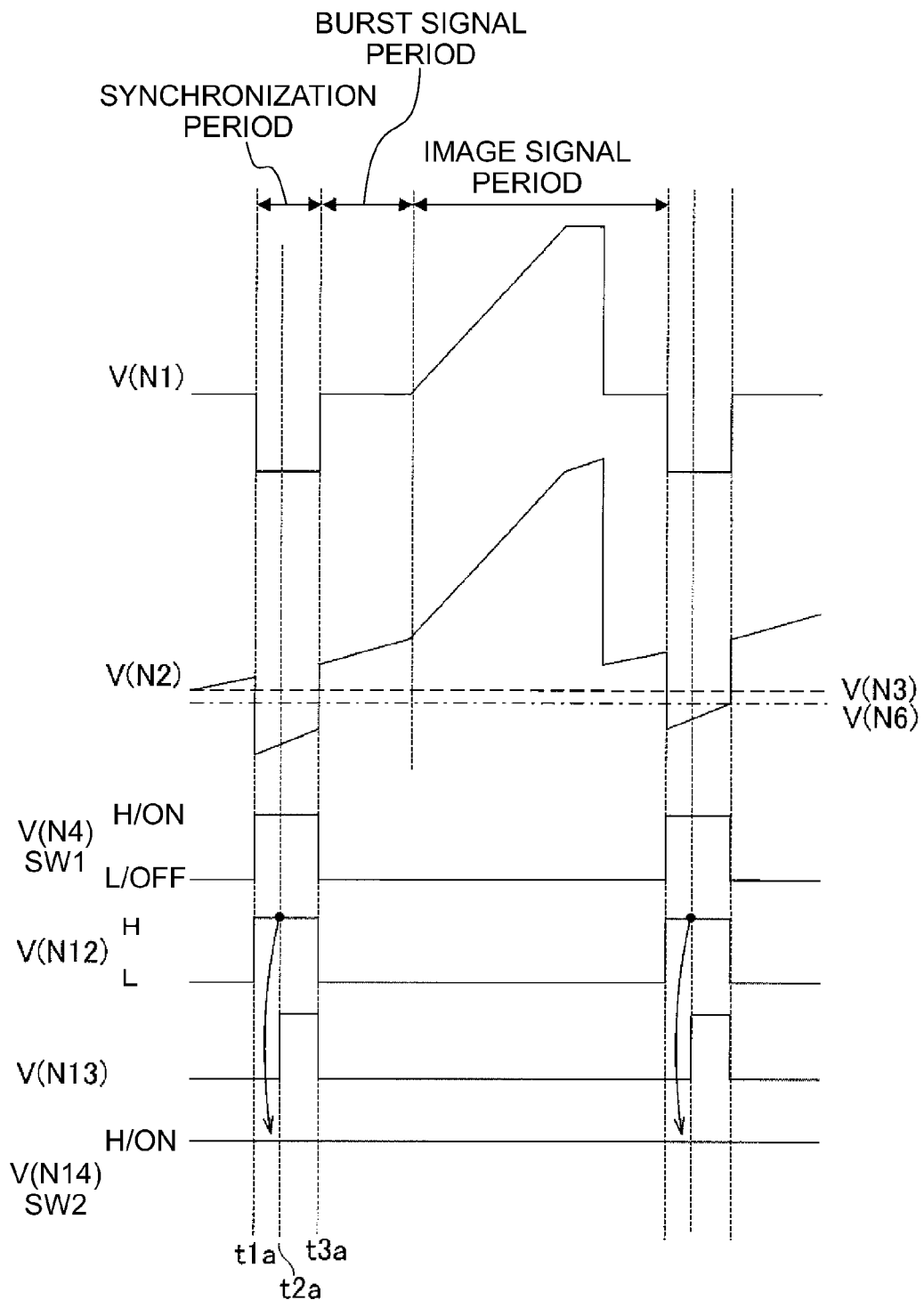
FIG. 17 is a diagram illustrating voltages of respective nodes of the clamp circuit, when the charging of the input capacitor C1 is not completed, according to the third exemplary embodiment.

As illustrated in FIG. 17, when the charging of the input capacitor C1 is not completed, the voltage V (N2) of the node N2 in the synchronization period is lower than the reference voltage V (N6) of the node N6. Further, the voltage V (N2) of the node N2 in the burst signal period and the image signal period is higher than the clamp reference voltage V (N3) of the node N3.

The operation of the first control circuit 32 of the clamp circuit 54 is substantially the same as the operation in the first and second exemplary embodiments when the charging of the input capacitor C1 is not completed. In the synchronization period, the comparator X1 compares the clamp reference voltage V (N3) of the node N3 and the voltage V (N2) of the node N2 (FIG. 16: step 500). Since the clamp reference voltage V (N3) is equal to or higher than the voltage V (N2) of the node N2 (FIG. 16: step 502), a control signal of H level is output from the comparator X1 to the control node N4, and the switching element SW1 becomes ON state (FIG. 16: step 504, FIG. 17: timing t1a).

Next, the operation of the second control circuit 56 of the clamp circuit 54 will be described. The comparator X4 compares the reference voltage V (N6) of the node N6 and the voltage V (N2) of the node N2 (FIG. 16: step 600). Since the reference voltage V (N6) in the synchronization period is equal to or higher than the voltage V (N2) of the node N2 (FIG. 16: step 602), a control signal of H level is output from the comparator X4 to the control node N12 (FIG. 16: step 604, FIG. 17: timing t1a).

In the synchronization period, when a control signal (pulse) is input to the control node N13 from the outside of the clamp circuit 54 (FIG. 16: step 606, FIG. 17: timing t2a), the DFF outputs H level, which is the present voltage level of the node N12, to the control node N14 (FIG. 16: step 608, FIG. 17: timing t2a).

Since the control node N14 is H level, the switching element SW2 becomes ON state (FIG. 16: step 610, FIG. 17: timing t2a).

As described above, at timing t1a, the switching element SW1 controlled by the first control circuit 32 becomes ON state, and the input capacitor C1 is charged by the current I1 supplied from the current source I1. Further, at timing t2a the switching element SW2 controlled by the second control circuit 56 also becomes ON state, and the input capacitor C1 is charged by the current I1 supplied from the current source I1.

In the synchronization period of the video signal, in the first control circuit 32, becomes, the voltage V (N2) of the node N2 <the reference voltage V (N6)<the clamp reference voltage V (N3) (FIG. 16: affirmative determination in step 506, FIG. 17: period between timing t1a and timing t3a). Accordingly, the voltage V (N4) of the control node N4 becomes H level, the switching element SW1 of the switching circuit 34 becomes ON state, and the input capacitor C1 is charged by the current I1 supplied from the current source I1.

On the other hand, in the second control circuit 56, since no control signal (pulse) is input to the control node N13, the DFF maintains the control signal of the control node N14 to H level. Accordingly, the switching element SW2 is maintained in the ON state.

When the synchronization period of the video signal ends, and the burst signal period and the image signal period start (FIG. 17: period starting from timing t3a), becomes, the reference voltage V (N6)<the clamp reference voltage V (N3) <the voltage V (N2) of the node N2 (FIG. 16: negative determination in step 506). Accordingly, the comparator X1 of the first control circuit 32 outputs a control signal of L level to the control node N4. As a result, the switching element SW1 of the switching circuit 34 becomes OFF state (FIG. 16: step 508, FIG. 17: timing t3a).

On the other hand, in the second control circuit 56, since no control signal (pulse) is input to the control node N13 in the burst signal period and the image signal period, the DFF maintains the control signal of the control node N14 to be in H level. Accordingly, the switching element SW2 is maintained in the ON state.

Therefore, in the burst signal period and the image signal period, although the switching element SW1 is in the OFF state, since the switching element SW2 is in the ON state, a current is supplied from the current source I1 to the node N2 and the input capacitor C1 is charged.

Figure 18:
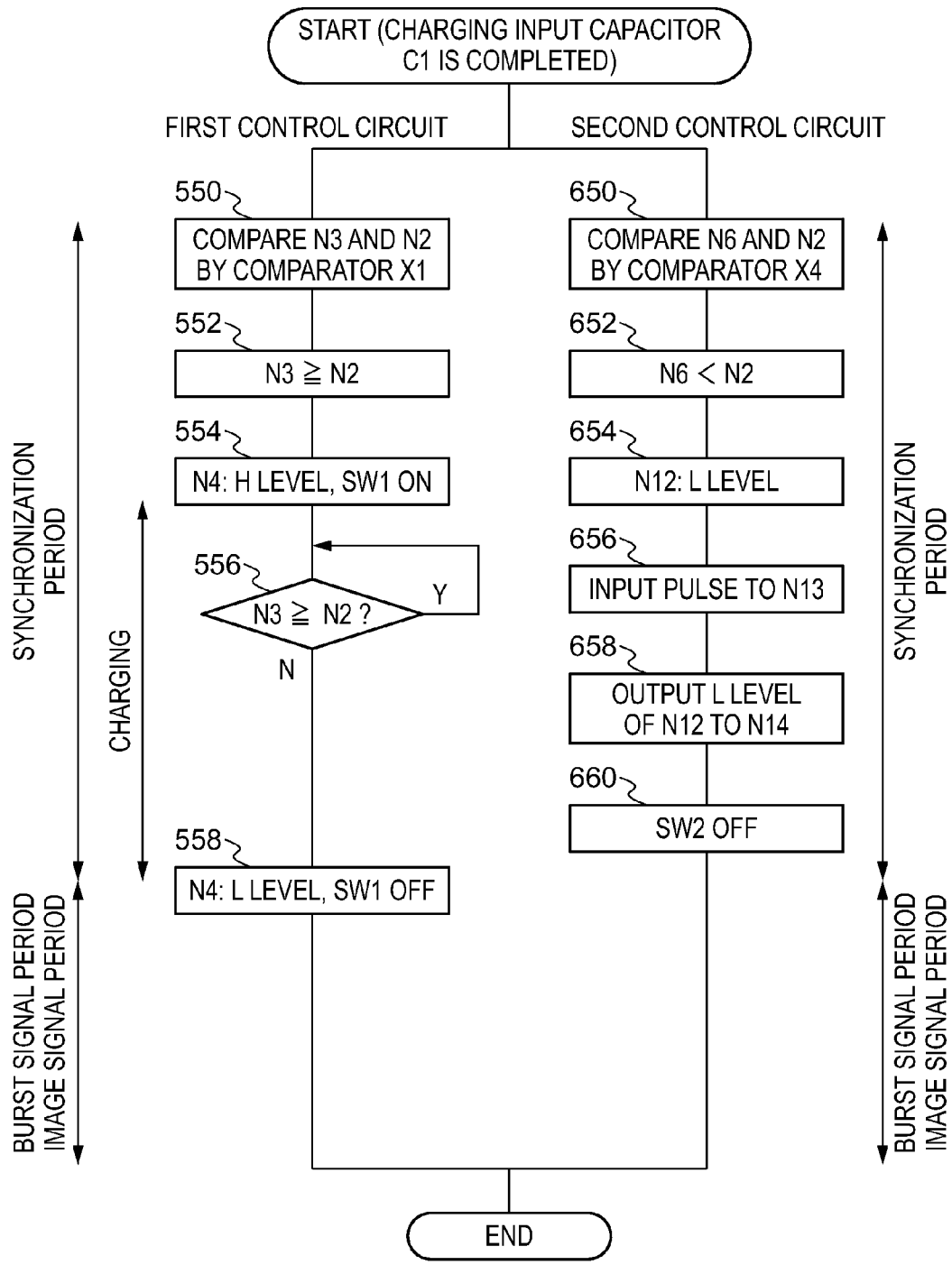
FIG. 18 is a flowchart illustrating a clamp operation of the clamp circuit, when the charging of the input capacitor C1 is completed, according to the third exemplary embodiment.

Next, the clamp operation and the voltages of respective nodes, when the charging of the input capacitor C1 is completed, will be described. FIG. 18 illustrates a flowchart of an example of a clamp operation in the clamp circuit 54, when the charging of the input capacitor C1 is completed. Further, FIG. 19 illustrates an example of the voltages of respective nodes of the clamp circuit 54.

Figure 19:
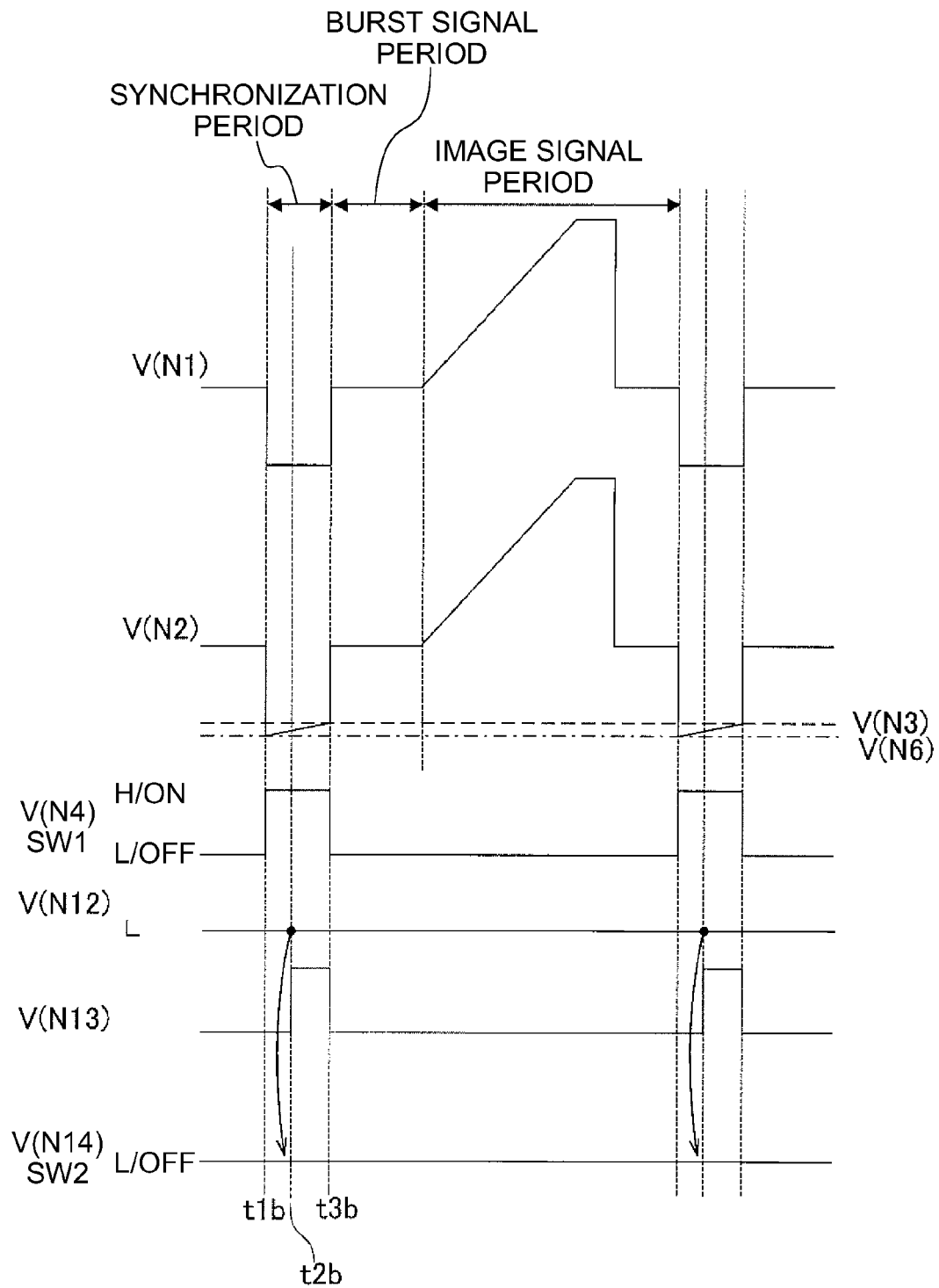
FIG. 19 is a diagram illustrating voltages of respective nodes of the clamp circuit, when the charging of the input capacitor C1 is completed, according to the third exemplary embodiment.
Figure 20:
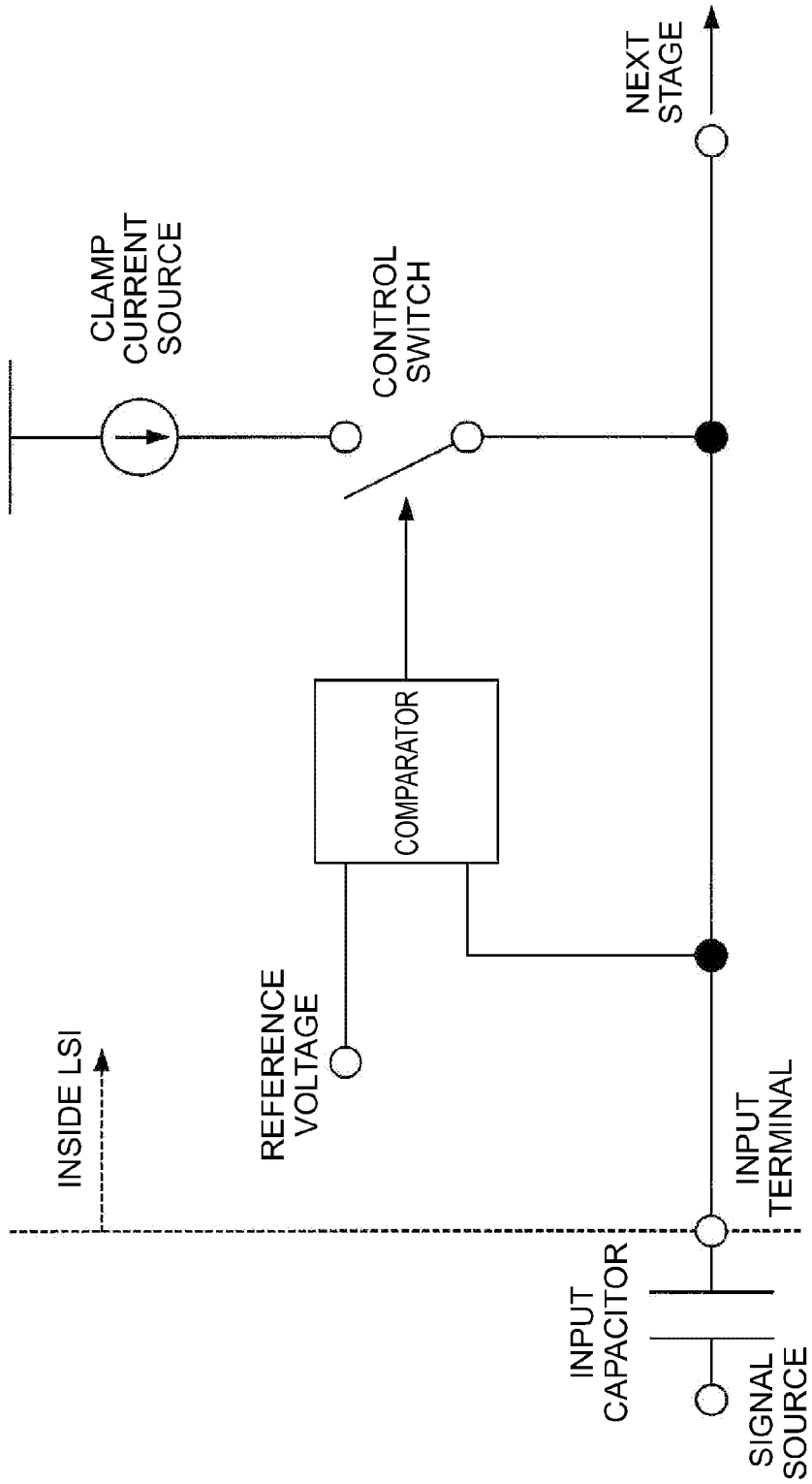
FIG. 20 is a circuit diagram illustrating an example of a conventional clamp circuit.

As illustrated in FIG. 19, when the charging of the input capacitor C1 is completed, in the synchronization period, the voltage V (N2) of the node N2 is higher than the reference voltage V (N6) of the node N6 and is lower than the clamp reference voltage V (N3) of the node N3. Further, in the burst signal period and the image signal period, the voltage V (N2) of the node N2 is higher than the clamp reference voltage V (N3) of the node N3.

The operation of the first control circuit 32 of the clamp circuit 54 is substantially the same as the operation in the first and second exemplary embodiments, when the charging of the input capacitor C1 is completed. In the synchronization period, the comparator X1 compares the clamp reference voltage V (N3) of the node N3 and the voltage V (N2) of the node N2 (FIG. 18: step 550). Since the clamp reference voltage V (N3) is equal to or higher than the voltage V (N2) of the node N2 (FIG. 18: step 552), a control signal of H level is output from the comparator X1 to the control node N4, and the switching element SW1 becomes ON state (FIG. 18: step 554, FIG. 19: timing t1b).

The operation of the second control circuit 56 of the clamp circuit 54 will be described. In the second control circuit 56, the comparator X4 compares the reference voltage V (N6) of the node N6 and the voltage V (N2) of the node N2 (FIG. 18: step 650). In the synchronization period, since, the reference voltage V (N6)<the voltage V (N2) of the node N2 (FIG. 18: step 652), a control signal of L level is output from the comparator X4 to the control node N12 (FIG. 18: step 654, FIG. 19: timing t1b).

In the synchronization period, when a control signal (pulse) is input to the control node N13 from the outside of the clamp circuit 54 (FIG. 18: step 656, FIG. 19: timing t2b), the DFF outputs L level, which is the present voltage level of the node N12, to the control node N14 (FIG. 18: step 658, FIG. 19: timing t2b).

Since the control node N14 is in L level, the switching element SW2 becomes OFF state (FIG. 18: step 660, FIG. 19: timing t2b).

As above, in the synchronization period of the video signal, at timing t1b, the switching element SW1 controlled by the first control circuit 32 becomes ON state, and the input capacitor C1 is charged by the current I1 supplied from the current source I1. On the other hand, although the switching element SW2 controlled by the second control circuit 56 is maintained in the OFF state, since the switching element SW1 is in the ON state, the input capacitor C1 is charged by the current I1 supplied from the current source I1.

In the synchronization period of the video signal, in the first control circuit 32, since the reference voltage V (N6)<the voltage V (N2) of the node N2<the clamp reference voltage V (N3) (FIG. 18: affirmative determination in step 556, FIG. 19: period between timing t1b and timing t3b), the voltage V (N4) of the control node N4 becomes H level, the switching element SW1 of the switching circuit 34 becomes ON state, and the input capacitor C1 is charged by the current I1 supplied from the current source I1.

On the other hand, in the second control circuit 56, since no control signal (pulse) is input to the control node N13, the DFF maintains the control signal of the control node N14 to be in L level, and accordingly, the switching element SW2 maintains the OFF state.

When the synchronization period of the video signal ends, and the burst signal period and the image signal period start (FIG. 19: period starting from timing t3b), becomes the reference voltage V (N6)<the clamp reference voltage V (N3) <the voltage V (N2) of the node N2 (FIG. 18: negative determination in step 556). Accordingly, the comparator X1 of the first control circuit 32 outputs a control signal of L level to the control node N4. As a result, the switching element SW1 of the switching circuit 34 becomes OFF state (FIG. 18: step 558, FIG. 19: timing t3b).

On the other hand, in the second control circuit 56, since no control signal (pulse) is input to the control node N13 in the burst signal period and the image signal period, the DFF maintains the control signal of the control node N14 to be in L level, and accordingly, the switching element SW2 maintains the OFF state.

As described above, in the burst signal period and the image signal period, since both the switching elements SW1 and SW2 of the switching circuit 34 are in the OFF state, no current I1 is supplied from the current source I1, and the input capacitor C1 is not charged.

As described above, the clamp circuit 54 in the semiconductor device 52 of the signal processing system 50 of the present exemplary embodiment includes the first control circuit 32, the switching circuit 34, and the second control circuit 56. The switching circuit 34 includes the switching elements SW1 and SW2 that are connected in parallel between the current source I1 and the node N2 (the input capacitor C1) and that turn to the ON state in accordance with the control signal of H level. The first control circuit 32 includes the comparator X1 that compares the voltage V (N2) of the node N2 and the clamp reference voltage V (N3) of the node N3, and outputs a control signal of H level to the control node N4, when the voltage V (N2) is equal to or lower than the clamp reference voltage V (N3). Further, the second control circuit 56 includes the comparator X4 that compares the reference voltage V (N6) of the node N6 and the voltage V (N9) of the node N9 and that outputs a comparison result to the node N12, and the DFF that receives a signal output to the node N12 as input data, receives a signal of the control node N13 as input control signal, and outputs a signal to the control node N14 of the switching element SW2. The comparator X4 compares the voltage V (N2) of the node N2 and the reference voltage V (N6) of the node N6, and outputs an H-level signal to the control node N12, when the voltage V (N2) is equal to or lower than the reference voltage V (N6). The DFF outputs and maintains, to the control node N14, the signal state of the node N12 at the rising timing of the control signal (pulse), that is input to the control node N13 from the outside of the clamp circuit 54.

When the charging of the input capacitor C1 is not completed, the voltage V (N2) of the node N2 in the synchronization period is lower than the reference voltage V (N6) of the node N6, and the voltage V (N2) of the node N2 in the burst signal period and the image signal period is higher than the clamp reference voltage V (N3) of the node N3, in the synchronization period, the comparator X1 of the first control circuit 32 outputs a control signal of H level to the control node N4, and the switching element SW1 of the switching circuit 34 becomes ON state.

Further, in the second control circuit 56, when a control signal (pulse) is input to the control node N13 from the outside of the clamp circuit 54, the DFF outputs H level, which is the present voltage level of the node N12, to the control node N14, and the switching element SW2 becomes ON state. In the synchronization period, the switching elements SW1 and SW2 of the switching circuit 34 are turned to the ON state, and the current (the clamp current) I1 supplied from the current source I1 is supplied to the node N2, whereby the input capacitor C1 is charged.

Further, in the burst signal period and the image signal period, the comparator X1 of the first control circuit 32 outputs a control signal of L level to the control node N4, and the switching element SW1 of the switching circuit 34 becomes OFF state. Further, in the second control circuit 56, since no control signal (pulse) is input to the control node N13, the DFF maintains the control signal of the control node N14 to be in L level. Therefore, the switching element SW2 maintains the OFF state, and the current (the clamp current) I1 supplied from the current source I1 is supplied to the node N2, whereby the input capacitor C1 is charged.

As described above, in the burst signal period and the image signal period, even after the switching element SW1 of the switching circuit 34 becomes OFF state, the switching element SW2 maintains the ON state, and the input capacitor C1 is charged by the current H. Accordingly, to the present exemplary embodiment may extend the charging period of the input capacitor C1 per cycle of the video signal, and may decrease the number of cycles of the video signal required for the charging of the input capacitor C1 to be completed.

Therefore, as in the first and second exemplary embodiments, the present exemplary embodiment may shorten the charging time required for charging the input capacitor C1 without decreasing the capacitance of the input capacitor C1 and without increasing the clamp current I1 required for charging.

Further, in the present exemplary embodiment, the charging period of the switching element SW2 continues until the synchronization period of the next cycle, as illustrated in FIG. 17. Accordingly, the present exemplary embodiment may further extend the width (duration) of the charging period in one cycle.

Further, in the present exemplary embodiment, the charging period of the input capacitor C1 can be controlled by the control signal (pulse) input to the node N13 of the DFF of the second control circuit 56. Therefore, the present like the second exemplary embodiment may further decrease the area of the clamp circuit 54 (the substrate 22), since the S/H circuit (FIG. 9: see the capacitor C3 and the switching element SW4) for maintaining the voltage V (N2) of the node N2 is not required as the second exemplary embodiment.

Further, when the charging of the input capacitor C1 is completed, in the second control circuit 56 in the synchronization period, since, the reference voltage V (N6) of the node N6 < the voltage V (N2) of the node N2, the control node N14 maintains the control signal to L level, and maintains the OFF state of the switching element SW2, the charging of the capacitor C2 is not performed. Further, when the synchronization period ends, since the switching element SW1 becomes OFF state and the switching element SW2 maintains the OFF state, the charging of the input capacitor C1 is not performed. Namely, in the present exemplary embodiment, as in the first and second exemplary embodiments, the reference voltage V (N6) is set lower than the clamp reference voltage V (N3), and specifically, is set to be lower than the lowest voltage of the voltage V (N2) of the node N2 (see FIG. 17) in the synchronization period, after clamping. Therefore, in the second control circuit 56, the control signal of the control node N14 is always in L level, and the switching element SW2 is maintained in the OFF state.

Therefore, since the input capacitor C1 is charged in only the synchronization period, the present exemplary embodiment may prevent overcharging of the input capacitor C1.

In the present exemplary embodiment, a case in which the second control circuit 56 is configured to include the DFF, has been described. However, the present invention is not limited thereto. The second control circuit 56 may include other types of flip flop circuit, without being limited to a particular type, as long as it is capable of maintaining the voltage V (N12) of the node N12 which is the input signal in the synchronization period as the voltage V (N14) of the node N14.

In the first to third exemplary embodiments, a case in which the clamp reference voltage V (N3) is lower than the reference voltage V (N6) has been described. However, the present invention is not limited thereto. The clamp reference voltage V (N3) may be equal to the reference voltage V (N6). However, as described above in the first to third exemplary embodiments, it is preferable for the clamp reference voltage V (N3) to be lower than the reference voltage V (N6), since the overcharging of the input capacitor C1 may be prevented.

Further, it is preferable to set the difference between the clamp reference voltage V (N3) and the reference voltage V (N6) small.

Further, in the first to third exemplary embodiments, a case in which the switching elements SW (SW1 to SW4) are MOS transistors has been described. However, the present invention is not limited thereto. Other switching elements may be used in common, such as bipolar transistors. Further, the comparators X (X1 to X4) are not particularly limited, and circuits (comparator circuit) may be used as the comparator.

Further, the configuration and operation of the clamp circuit described in the first to third exemplary embodiments are exemplary and can be changed with situation within the range without departing from the merit of the present invention.

What is claimed is:

1. A clamp circuit comprising:
a switching section including a first switching element and a second switching element connected in parallel between a current supply source and a clamp capacitor;
a first control section that controls the first switching element to connect the current supply source and the clamp capacitor to charge the clamp capacitor, when a voltage of an input signal input via the clamp capacitor is lower than a first reference voltage; and
a second control section that controls the second switching element to connect the current supply source and the clamp capacitor to charge the clamp capacitor for a predetermined period, based on voltage information stored in accordance with the input signal, when the voltage of the input signal is lower than a second reference voltage.

2. The clamp circuit according to claim 1, wherein the first reference voltage is higher than the second reference voltage.

3. The clamp circuit according to claim 1,
wherein the second control section includes a charge storage section that stores charges corresponding to the voltage information, and
wherein the predetermined period in which the clamp capacitor is charged is predetermined based on the charges stored in the charge storage section.

4. The clamp circuit according to claim 3,
wherein the charge storage section is a capacitor having one end connected to a ground potential and the other end connected to a third switching element, and
wherein the second control section includes a resistor element connected in parallel to the capacitor, the third switching element that connects the capacitor and a power supply, and a comparing section that compares the second reference voltage with the input signal and when the input signal is lower than the second reference voltage, outputs a control signal to the third switching to connect the capacitor and the power supply element.

5. The clamp circuit according to claim 3,
wherein the second control section includes a comparing section that outputs a control signal to the second switching element to connect the current supply source and the clamp capacitor, when the input signal is lower than the second reference voltage, and a fourth switching element that connects the comparing section and the clamp capacitor to input the input signal to the comparing section, based on a charge control signal input in accordance with a charging period, and
wherein the charge storage section is a capacitor having one end grounded and the other end connected between the fourth switching element and the comparing section.

6. The clamp circuit according to claim 1, wherein the second control section includes:

a comparing section that outputs a comparison result signal corresponding to a result of a comparison between the second reference voltage and the voltage of the input signal, and an output holding section that holds the comparison result signal output from the comparing section based on a control signal input in accordance with a synchronization signal included in the input signal.

7. A semiconductor device comprising:

a first terminal electrically connected to a clamp capacitor that adds a voltage to an inputted signal to generate an input signal;

a second terminal electrically connected to a current supply source;

a switching section including a first switching element and a second switching element connected in parallel between the first terminal and the second terminal;

a first control section that controls the first switching element to connect the current supply source and the clamp capacitor to charge the clamp capacitor, when a voltage of the input signal input via the clamp capacitor is lower than a first reference voltage; and a second control section that controls the second switching element to connect the current supply source and the clamp capacitor to charge the clamp capacitor for a predetermined period, based on voltage information stored in accordance with the input signal, when the voltage of the input signal is lower than a second reference voltage.

8. A signal processing system comprising:

a clamp capacitor that adds a voltage to an inputted signal to generate an input signal;

a current supply source; and a semiconductor device, wherein the semiconductor device includes a first terminal electrically connected to the clamp capacitor, a second terminal electrically connected to the current supply source, a switching section including the first switching element and second switching element connected in parallel between the first terminal and the second terminal;

a first control section that controls the first switching element to connect the current supply source and the clamp capacitor to charge the clamp capacitor, when a voltage of the input signal input via the clamp capacitor is lower than a first reference voltage; and a second control section that controls the second switching element to connect the current supply source and the clamp capacitor to charge the clamp capacitor for a predetermined period, based on voltage information stored in accordance with the input signal, when the voltage of the input signal is lower than a second reference voltage.

9. A signal clamping method comprising:

generating an input signal by adding a voltage to an inputted signal using a clamp capacitor;

controlling, by a first control section, a first switching element connected between the clamp capacitor and a current supply source, such that the current supply source and the clamp capacitor are connected so that the clamp capacitor is charged by the current supply source, when a voltage of the input signal input via the clamp capacitor is lower than a first reference voltage; and controlling, by a second control section, such that a second switching element, connected in parallel to the first switching element, connects the current supply source and the clamp capacitor to charge the clamp capacitor for a predetermined period, based on voltage information stored in accordance with the input signal, when the voltage of the input signal is lower than a second reference voltage.

10. The signal clamping method according to claim 9, wherein the first reference voltage is higher than the second reference voltage.

11. The signal clamping method according to claim 9, wherein controlling by second control section includes, storing, in a charge storage section, charges corresponding to the voltage information in accordance with the input signal, when the input signal is lower than the second reference voltage, and controlling, by second control section, the second switching element connected in parallel to the first switching element to connect the current supply source and the clamp capacitor to charge the clamp capacitor by the current supply source for the predetermined period, predetermined based on the charges stored in the charge storage section.

12. The signal clamping method according to claim 11, wherein the voltage information is the voltage of the input signal, and the charge storage section stores charges corresponding to the voltage of the input signal.

13. A clamp circuit comprising:

a switching element connected between a current supply source and a clamp capacitor;

a control section that controls the switching element to connect the current supply source and the clamp capacitor to charge the clamp capacitor for a predetermined period, based on voltage information stored in a holding section in accordance with a control signal input to the holding section, when the voltage of an input signal input via the clamp capacitor is lower than a reference voltage.

14. The clamp circuit according to claim 13, wherein the control section includes, a comparing section that outputs a comparison result signal corresponding to the result of the comparison between a second reference voltage and the input signal, wherein the holding section holds the comparison result signal output from the comparing section as the voltage information, based on the control signal input in accordance with a synchronization signal included in the input signal.

* * * * *